US010585522B2

(12) United States Patent
Lynn et al.

(10) Patent No.: US 10,585,522 B2
(45) Date of Patent: Mar. 10, 2020

(54) DETECTION OF NON-TOUCH INPUTS USING A SIGNATURE

(71) Applicant: Sentons Inc., San Jose, CA (US)

(72) Inventors: Lapoe E. Lynn, Los Altos, CA (US); Shirish A. Altekar, Palo Alto, CA (US); Stanislav Maximov, Mountain View, CA (US)

(73) Assignee: Sentons Inc. (KY)

( * ) Notice: Subject to any disclaimer, the term of this patent is extended or adjusted under 35 U.S.C. 154(b) by 1 day.

(21) Appl. No.: 15/811,016

(22) Filed: Nov. 13, 2017

(65) Prior Publication Data
US 2018/0246612 A1    Aug. 30, 2018

Related U.S. Application Data

(60) Provisional application No. 62/463,919, filed on Feb. 27, 2017.

(51) Int. Cl.
*G06F 3/041* (2006.01)

(52) U.S. Cl.
CPC .......... *G06F 3/0414* (2013.01); *G06F 3/0412* (2013.01); *G06F 2203/04104* (2013.01)

(58) Field of Classification Search
CPC ...... G06F 3/041; G06F 3/0414; G06F 3/0412; G06F 3/0416; G06F 3/0418; G06F 3/043; G06F 3/0436; G06F 3/0488; G06F 2203/04104; H03D 3/02; H03D 3/20
USPC ........................................................ 345/173
See application file for complete search history.

(56) References Cited

U.S. PATENT DOCUMENTS

| 3,912,880 A | 10/1975 | Powter |
| 4,488,000 A | 12/1984 | Glenn |
| 4,529,959 A | 7/1985 | Ito |
| 4,594,695 A | 6/1986 | Garconnat |
| 4,966,150 A | 10/1990 | Etienne |
| 5,074,152 A | 12/1991 | Ellner |
| 5,091,406 A | 2/1992 | Toda |
| 5,233,873 A | 8/1993 | Mozgowiec |
| 5,334,805 A | 8/1994 | Knowles |
| 5,451,723 A | 9/1995 | Huang |

(Continued)

FOREIGN PATENT DOCUMENTS

| CN | 1914585   | 2/2007 |
| CN | 101373415 B | 2/2009 |

(Continued)

OTHER PUBLICATIONS

Liu et al., 'Acoustic Wave Approach for Multi-Touch Tactile Sensing', Micro-NanoMechatronics and Human Science, 2009. MHS 2009. International Symposium, Nov. 9-11, 2009.

(Continued)

*Primary Examiner* — Amare Mengistu
*Assistant Examiner* — Gloryvid Figueroa-Gibson
(74) *Attorney, Agent, or Firm* — Van Pelt, Yi & James LLP

(57) ABSTRACT

A propagating signal transmitted through a propagating medium is received where a detected disturbance to a signal property of the propagating signal is analyzed to detect whether a touch input has been provided. It is determined whether the detected disturbance matches a signature and in the event it is determined that the detected disturbance matches the signature, it is determined that the detected disturbance does not correspond to the touch input.

15 Claims, 17 Drawing Sheets

(56) References Cited

U.S. PATENT DOCUMENTS

| | | |
|---|---|---|
| 5,563,849 A | 10/1996 | Hall |
| 5,573,077 A | 11/1996 | Knowles |
| 5,591,945 A | 1/1997 | Kent |
| 5,635,643 A | 6/1997 | Maji |
| 5,637,839 A | 6/1997 | Yamaguchi |
| 5,638,093 A | 6/1997 | Takahashi |
| 5,708,460 A | 1/1998 | Young |
| 5,739,479 A | 4/1998 | Davis-Cannon |
| 5,784,054 A | 7/1998 | Armstrong |
| 5,854,450 A | 12/1998 | Kent |
| 5,883,457 A | 3/1999 | Rinde |
| 5,912,659 A | 6/1999 | Rutledge |
| 6,091,406 A | 7/2000 | Kambara |
| 6,211,772 B1 | 4/2001 | Murakami |
| 6,232,960 B1 | 5/2001 | Goldman |
| 6,236,391 B1 | 5/2001 | Kent |
| 6,254,105 B1 | 7/2001 | Rinde |
| 6,262,946 B1 | 7/2001 | Khuri-Yakub |
| 6,307,942 B1 | 10/2001 | Azima |
| 6,473,075 B1 | 10/2002 | Gomes |
| 6,492,979 B1 | 12/2002 | Kent |
| 6,498,603 B1 | 12/2002 | Wallace |
| 6,507,772 B1 | 1/2003 | Gomes |
| 6,535,147 B1 | 3/2003 | Masters |
| 6,567,077 B2 | 5/2003 | Inoue |
| 6,630,929 B1 | 10/2003 | Adler |
| 6,633,280 B1 | 10/2003 | Matsumoto |
| 6,636,201 B1 | 10/2003 | Gomes |
| 6,788,296 B2 | 9/2004 | Ikeda |
| 6,798,403 B2 | 9/2004 | Kitada |
| 6,856,259 B1 | 2/2005 | Sharp |
| 6,891,527 B1 | 5/2005 | Chapman |
| 6,922,642 B2 | 7/2005 | Sullivan |
| 6,948,371 B2 | 9/2005 | Tanaka |
| 7,000,474 B2 | 2/2006 | Kent |
| 7,006,081 B2 | 2/2006 | Kent |
| 7,116,315 B2 | 10/2006 | Sharp |
| 7,119,800 B2 | 10/2006 | Kent |
| 7,187,369 B1 | 3/2007 | Kanbara |
| 7,193,617 B1 | 3/2007 | Kanbara |
| 7,204,148 B2 | 4/2007 | Tanaka |
| 7,218,248 B2 | 5/2007 | Kong |
| 7,274,358 B2 | 9/2007 | Kent |
| RE39,881 E | 10/2007 | Flowers |
| 7,315,336 B2 | 1/2008 | North |
| 7,345,677 B2 | 3/2008 | Ing |
| 7,411,581 B2 | 8/2008 | Hardie-Bick |
| 7,456,825 B2 | 11/2008 | Kent |
| 7,511,711 B2 | 3/2009 | Ing |
| 7,545,365 B2 | 6/2009 | Kent |
| 7,554,246 B2 | 6/2009 | Maruyama |
| 7,583,255 B2 | 9/2009 | Ing |
| 7,649,807 B2 | 1/2010 | Ing |
| 7,683,894 B2 | 3/2010 | Kent |
| 7,880,721 B2 | 2/2011 | Suzuki |
| 7,920,133 B2 | 4/2011 | Tsumura |
| 8,059,107 B2 | 11/2011 | Hill |
| 8,085,124 B2 | 12/2011 | Ing |
| 8,194,051 B2 | 6/2012 | Wu |
| 8,228,121 B2 | 7/2012 | Benhamouda |
| 8,237,676 B2 | 8/2012 | Duheille |
| 8,319,752 B2 | 11/2012 | Hardie-Bick |
| 8,325,159 B2 | 12/2012 | Kent |
| 8,358,277 B2 | 1/2013 | Mosby |
| 8,378,974 B2 | 2/2013 | Aroyan |
| 8,392,486 B2 | 3/2013 | Ing |
| 8,418,083 B1 | 4/2013 | Lundy |
| 8,427,423 B2 | 4/2013 | Tsumura |
| 8,436,806 B2 | 5/2013 | Almalki |
| 8,436,808 B2 | 5/2013 | Chapman |
| 8,493,332 B2 | 7/2013 | D'Souza |
| 8,519,982 B2 | 8/2013 | Camp, Jr. |
| 8,576,202 B2 | 11/2013 | Tanaka |
| 8,619,063 B2 | 12/2013 | Chaine |
| 8,638,318 B2 | 1/2014 | Gao |
| 8,648,815 B2 | 2/2014 | Kent |
| 8,659,579 B2 | 2/2014 | Nadjar |
| 8,670,290 B2 | 3/2014 | Aklil |
| 8,681,128 B2 | 3/2014 | Scharff |
| 8,692,809 B2 | 4/2014 | D'Souza |
| 8,692,810 B2 | 4/2014 | Ing |
| 8,692,812 B2 | 4/2014 | Hecht |
| 8,730,213 B2 | 5/2014 | D'Souza |
| 8,749,517 B2 | 6/2014 | Aklil |
| 8,787,599 B2 | 7/2014 | Grattan |
| 8,791,899 B1 | 7/2014 | Usey |
| 8,823,685 B2 | 9/2014 | Scharff |
| 8,854,339 B2 | 10/2014 | Kent |
| 8,890,852 B2 | 11/2014 | Aroyan |
| 8,896,429 B2 | 11/2014 | Chaine |
| 8,896,564 B2 | 11/2014 | Scharff |
| 8,917,249 B1 | 12/2014 | Buuck |
| 8,941,624 B2 | 1/2015 | Kent |
| 8,946,973 B2 | 2/2015 | Pelletier |
| 8,994,696 B2 | 3/2015 | Berget |
| 9,030,436 B2 | 5/2015 | Ikeda |
| 9,041,662 B2 | 5/2015 | Harris |
| 9,046,959 B2 | 6/2015 | Schevin |
| 9,046,966 B2 | 6/2015 | D'Souza |
| 9,058,071 B2 | 6/2015 | Esteve |
| 9,099,971 B2 | 8/2015 | Lynn |
| 9,189,109 B2 | 11/2015 | Sheng |
| 9,250,742 B1 | 2/2016 | Usey |
| 9,348,468 B2 | 5/2016 | Altekar |
| 9,477,350 B2 | 10/2016 | Sheng |
| 9,594,450 B2 | 3/2017 | Lynn |
| 9,983,718 B2 | 5/2018 | Sheng |
| 10,209,825 B2 | 2/2019 | Sheng |
| 2001/0050677 A1 | 12/2001 | Tosaya |
| 2002/0036621 A1 | 3/2002 | Liu |
| 2002/0047833 A1 | 4/2002 | Kitada |
| 2002/0185981 A1 | 12/2002 | Dietz |
| 2003/0161484 A1 | 8/2003 | Kanamori |
| 2003/0164820 A1 | 9/2003 | Kent |
| 2003/0189745 A1 | 10/2003 | Kikuchi |
| 2003/0197691 A1 | 10/2003 | Fujiwara |
| 2003/0206162 A1 | 11/2003 | Roberts |
| 2004/0133366 A1 | 7/2004 | Sullivan |
| 2004/0160421 A1 | 8/2004 | Sullivan |
| 2004/0183788 A1 | 9/2004 | Kurashima |
| 2004/0203594 A1* | 10/2004 | Kotzin ............ G06K 9/00154 455/411 |
| 2004/0239649 A1 | 12/2004 | Ludtke |
| 2004/0246239 A1 | 12/2004 | Knowles |
| 2005/0063553 A1 | 3/2005 | Ozawa |
| 2005/0146511 A1 | 7/2005 | Hill |
| 2005/0146512 A1 | 7/2005 | Hill |
| 2005/0174338 A1 | 8/2005 | Ing |
| 2005/0226455 A1 | 10/2005 | Aubauer |
| 2005/0229713 A1 | 10/2005 | Niblock |
| 2005/0248540 A1 | 11/2005 | Newton |
| 2005/0248547 A1 | 11/2005 | Kent |
| 2006/0071912 A1 | 4/2006 | Hill |
| 2006/0109261 A1 | 5/2006 | Chou |
| 2006/0114233 A1 | 6/2006 | Radivojevic |
| 2006/0139339 A1 | 6/2006 | Pechman |
| 2006/0139340 A1 | 6/2006 | Geaghan |
| 2006/0152499 A1 | 7/2006 | Roberts |
| 2006/0166681 A1 | 7/2006 | Lohbihler |
| 2006/0197753 A1 | 9/2006 | Hotelling |
| 2006/0262104 A1 | 11/2006 | Sullivan |
| 2006/0279548 A1 | 12/2006 | Geaghan |
| 2006/0284841 A1 | 12/2006 | Hong |
| 2007/0019825 A1 | 1/2007 | Marumoto |
| 2007/0109274 A1 | 5/2007 | Reynolds |
| 2007/0165009 A1 | 7/2007 | Sakurai |
| 2007/0171212 A1 | 7/2007 | Sakurai |
| 2007/0183520 A1 | 8/2007 | Kim |
| 2007/0211022 A1 | 9/2007 | Boillot |
| 2007/0214462 A1 | 9/2007 | Boillot |
| 2007/0229479 A1 | 10/2007 | Choo |
| 2007/0236450 A1 | 10/2007 | Colgate |
| 2007/0240913 A1 | 10/2007 | Schermerhorn |
| 2007/0278896 A1 | 12/2007 | Sarkar |

(56) References Cited

U.S. PATENT DOCUMENTS

| | | |
|---|---|---|
| 2007/0279398 A1 | 12/2007 | Tsumura |
| 2008/0018618 A1 | 1/2008 | Hill |
| 2008/0030479 A1 | 2/2008 | Lowles |
| 2008/0062151 A1 | 3/2008 | Kent |
| 2008/0081671 A1 | 4/2008 | Wang |
| 2008/0105470 A1 | 5/2008 | Van De Ven |
| 2008/0111788 A1 | 5/2008 | Rosenberg |
| 2008/0169132 A1 | 7/2008 | Ding |
| 2008/0174565 A1 | 7/2008 | Chang |
| 2008/0198145 A1 | 8/2008 | Knowles |
| 2008/0231612 A1 | 9/2008 | Hill |
| 2008/0259030 A1 | 10/2008 | Holtzman |
| 2008/0266266 A1 | 10/2008 | Kent |
| 2008/0284755 A1 | 11/2008 | Hardie-Bick |
| 2009/0009488 A1* | 1/2009 | D'Souza ............ G06F 3/0436 345/177 |
| 2009/0103853 A1 | 4/2009 | Daniel |
| 2009/0116661 A1 | 5/2009 | Hetherington |
| 2009/0146533 A1 | 6/2009 | Leskinen |
| 2009/0160728 A1 | 6/2009 | Emrick |
| 2009/0167704 A1 | 7/2009 | Terlizzi |
| 2009/0237372 A1 | 9/2009 | Kim |
| 2009/0271004 A1 | 10/2009 | Zecchin |
| 2009/0273583 A1 | 11/2009 | Norhammar |
| 2009/0309853 A1 | 12/2009 | Hildebrandt |
| 2009/0315848 A1 | 12/2009 | Ku |
| 2010/0026667 A1 | 2/2010 | Bernstein |
| 2010/0027810 A1 | 2/2010 | Marton |
| 2010/0044121 A1 | 2/2010 | Simon |
| 2010/0045635 A1 | 2/2010 | Soo |
| 2010/0079264 A1 | 4/2010 | Hoellwarth |
| 2010/0117933 A1 | 5/2010 | Gothard |
| 2010/0117993 A1 | 5/2010 | Kent |
| 2010/0141408 A1 | 6/2010 | Doy |
| 2010/0156818 A1 | 6/2010 | Burrough |
| 2010/0165215 A1 | 7/2010 | Shim |
| 2010/0185989 A1 | 7/2010 | Shiplacoff |
| 2010/0188356 A1 | 7/2010 | Vu |
| 2010/0245265 A1 | 9/2010 | Sato |
| 2010/0269040 A1 | 10/2010 | Lee |
| 2010/0277431 A1 | 11/2010 | Klinghult |
| 2010/0309139 A1 | 12/2010 | Ng |
| 2010/0315373 A1 | 12/2010 | Steinhauser |
| 2010/0321312 A1 | 12/2010 | Han |
| 2010/0321325 A1 | 12/2010 | Springer |
| 2010/0321337 A1 | 12/2010 | Liao |
| 2011/0001707 A1 | 1/2011 | Faubert |
| 2011/0001708 A1 | 1/2011 | Sleeman |
| 2011/0012717 A1 | 1/2011 | Pance |
| 2011/0013785 A1 | 1/2011 | Kim |
| 2011/0018695 A1 | 1/2011 | Bells |
| 2011/0025649 A1 | 2/2011 | Sheikhzadeh |
| 2011/0042152 A1 | 2/2011 | Wu |
| 2011/0057903 A1 | 3/2011 | Yamano |
| 2011/0063228 A1 | 3/2011 | St Pierre |
| 2011/0080350 A1 | 4/2011 | Almalki |
| 2011/0084912 A1 | 4/2011 | Almalki |
| 2011/0084937 A1 | 4/2011 | Chang |
| 2011/0155479 A1 | 6/2011 | Oda |
| 2011/0156967 A1 | 6/2011 | Oh |
| 2011/0167391 A1 | 7/2011 | Momeyer |
| 2011/0175813 A1 | 7/2011 | Sarwar |
| 2011/0182443 A1 | 7/2011 | Gant |
| 2011/0191680 A1 | 8/2011 | Chae |
| 2011/0199342 A1 | 8/2011 | Vartanian |
| 2011/0213223 A1 | 9/2011 | Kruglick |
| 2011/0222372 A1 | 9/2011 | O'Donovan |
| 2011/0225549 A1 | 9/2011 | Kim |
| 2011/0234545 A1 | 9/2011 | Tanaka |
| 2011/0260988 A1 | 10/2011 | Colgate |
| 2011/0260990 A1 | 10/2011 | Ali |
| 2011/0279382 A1 | 11/2011 | Pertuit |
| 2011/0298670 A1 | 12/2011 | Jung |
| 2011/0300845 A1 | 12/2011 | Lee |
| 2011/0304577 A1 | 12/2011 | Brown |
| 2011/0316784 A1 | 12/2011 | Bisutti |
| 2011/0316790 A1 | 12/2011 | Ollila |
| 2012/0001875 A1 | 1/2012 | Li |
| 2012/0002820 A1 | 1/2012 | Leichter |
| 2012/0007837 A1 | 1/2012 | Kent |
| 2012/0026114 A1 | 2/2012 | Lee |
| 2012/0030628 A1 | 2/2012 | Lee |
| 2012/0032928 A1 | 2/2012 | Alberth |
| 2012/0050230 A1 | 3/2012 | Harris |
| 2012/0062564 A1 | 3/2012 | Miyashita |
| 2012/0068939 A1 | 3/2012 | Pemberton-Pigott |
| 2012/0068970 A1 | 3/2012 | Pemberton-Pigott |
| 2012/0081337 A1 | 4/2012 | Camp, Jr. |
| 2012/0088548 A1 | 4/2012 | Yun |
| 2012/0092964 A1 | 4/2012 | Badiey |
| 2012/0120031 A1 | 5/2012 | Thuillier |
| 2012/0126962 A1 | 5/2012 | Ujii |
| 2012/0127088 A1 | 5/2012 | Pance |
| 2012/0140954 A1 | 6/2012 | Ranta |
| 2012/0144293 A1 | 6/2012 | Kim |
| 2012/0149437 A1 | 6/2012 | Zurek |
| 2012/0188194 A1 | 7/2012 | Sulem |
| 2012/0188889 A1 | 7/2012 | Sambhwani |
| 2012/0194466 A1 | 8/2012 | Posamentier |
| 2012/0200517 A1 | 8/2012 | Nikolovski |
| 2012/0206154 A1 | 8/2012 | Pant |
| 2012/0229407 A1 | 9/2012 | Harris |
| 2012/0232834 A1 | 9/2012 | Roche |
| 2012/0235866 A1 | 9/2012 | Kim |
| 2012/0242603 A1 | 9/2012 | Engelhardt |
| 2012/0270605 A1 | 10/2012 | Garrone |
| 2012/0272089 A1 | 10/2012 | Hatfield |
| 2012/0278490 A1 | 11/2012 | Sennett |
| 2012/0282944 A1 | 11/2012 | Zhao |
| 2012/0300956 A1 | 11/2012 | Horii |
| 2012/0306823 A1 | 12/2012 | Pance |
| 2013/0011144 A1 | 1/2013 | Amiri |
| 2013/0050133 A1 | 2/2013 | Brakensiek |
| 2013/0050154 A1 | 2/2013 | Guy |
| 2013/0057491 A1 | 3/2013 | Chu |
| 2013/0059532 A1 | 3/2013 | Mahanfar |
| 2013/0082970 A1 | 4/2013 | Frey |
| 2013/0127755 A1 | 5/2013 | Lynn |
| 2013/0141365 A1 | 6/2013 | Lynn |
| 2013/0147768 A1 | 6/2013 | Aroyan |
| 2013/0194208 A1 | 8/2013 | Miyanaka |
| 2013/0222274 A1 | 8/2013 | Mori |
| 2013/0234995 A1 | 9/2013 | Son |
| 2013/0249831 A1 | 9/2013 | Harris |
| 2014/0028576 A1 | 1/2014 | Shahparnia |
| 2014/0078070 A1 | 3/2014 | Armstrong-Muntner |
| 2014/0078086 A1 | 3/2014 | Bledsoe |
| 2014/0078109 A1 | 3/2014 | Armstrong-Muntner |
| 2014/0078112 A1 | 3/2014 | Sheng |
| 2014/0185834 A1 | 7/2014 | Frömel |
| 2014/0247230 A1 | 9/2014 | Sheng |
| 2014/0247250 A1* | 9/2014 | Sheng ............... G06F 3/0436 345/177 |
| 2014/0317722 A1 | 10/2014 | Tartz |
| 2014/0362055 A1 | 12/2014 | Altekar |
| 2014/0368464 A1 | 12/2014 | Singnurkar |
| 2015/0002415 A1 | 1/2015 | Lee |
| 2015/0009185 A1 | 1/2015 | Shi |
| 2015/0109239 A1 | 4/2015 | Mao |
| 2015/0199035 A1 | 7/2015 | Chang |
| 2015/0253895 A1 | 9/2015 | Kim |
| 2015/0346850 A1 | 12/2015 | Vandermeijden |
| 2015/0366504 A1 | 12/2015 | Connor |
| 2016/0070404 A1 | 3/2016 | Kerr |
| 2016/0091308 A1 | 3/2016 | Oliaei |
| 2016/0162044 A1 | 6/2016 | Ciou |
| 2016/0179249 A1 | 6/2016 | Ballan |
| 2016/0209944 A1 | 7/2016 | Shim |
| 2016/0282312 A1 | 9/2016 | Cable |
| 2016/0282965 A1 | 9/2016 | Jensen |
| 2016/0349913 A1 | 12/2016 | Lynn |
| 2016/0349922 A1 | 12/2016 | Choi |
| 2017/0010697 A1 | 1/2017 | Jiang |

(56) References Cited

U.S. PATENT DOCUMENTS

| | | |
|---|---|---|
| 2017/0020402 A1 | 1/2017 | Rogers |
| 2017/0083164 A1 | 3/2017 | Sheng |
| 2018/0032211 A1 | 2/2018 | King |

FOREIGN PATENT DOCUMENTS

| | | |
|---|---|---|
| CN | 101568898 | 10/2009 |
| CN | 101669088 B | 3/2010 |
| CN | 101978344 | 2/2011 |
| CN | 103677339 | 7/2017 |
| EP | 2315101 A1 | 4/2011 |
| EP | 2315101 B1 | 1/2014 |
| FR | 2948787 B1 | 2/2011 |
| JP | H07160355 | 6/1995 |
| JP | 2005092527 A | 4/2005 |
| JP | 5723499 | 5/2015 |
| KR | 20040017272 | 2/2004 |
| KR | 20070005580 | 1/2007 |
| KR | 20080005990 | 1/2008 |
| KR | 20110001839 | 1/2011 |
| WO | WO-03005292 A1 | 1/2003 |
| WO | 2006115947 | 11/2006 |
| WO | 2006131022 A1 | 12/2006 |
| WO | WO-2006115947 A3 | 6/2007 |
| WO | 2009028680 A1 | 3/2009 |
| WO | 2011010037 | 1/2011 |
| WO | WO-2011010037 A1 | 1/2011 |
| WO | WO-2011024434 | 3/2011 |
| WO | WO-2011048433 A1 | 4/2011 |
| WO | WO-2011051722 | 5/2011 |
| WO | WO-2012010912 A2 | 1/2012 |
| WO | 2014066621 | 6/2014 |
| WO | WO-2014209757 A1 | 12/2014 |
| WO | WO-2015027017 | 2/2015 |
| WO | 2015127167 | 8/2015 |

OTHER PUBLICATIONS

T Benedict et al. 'The joint estimation of signal and noise from the sum envelope.' IEEE Transactions on Information Theory 13.3, pp. 447-454. Jul. 1, 1967.

\* cited by examiner

DETECTION OF NON-TOUCH INPUTS USING A SIGNATURE

CROSS REFERENCE TO OTHER APPLICATIONS

This application claims priority to U.S. Provisional Patent Application No. 62/463,919 entitled DETECTION OF NON-TOUCH INPUTS USING A SIGNATURE filed Feb. 27, 2017 which is incorporated herein by reference for all purposes.

BACKGROUND OF THE INVENTION

New types of touch detection techniques are being developed which use acoustic or ultrasonic signals to detect a touch on a touch surface. For example, the touch surface may be part of a cell phone, a tablet, a laptop, etc. However, these new touch detection techniques may sometimes identify a touch when there is in fact no touch (i.e., a false positive). New techniques to identify and prevent such false positives would be desirable.

BRIEF DESCRIPTION OF THE DRAWINGS

Various embodiments of the invention are disclosed in the following detailed description and the accompanying drawings.

DETAILED DESCRIPTION

Figure 1A:
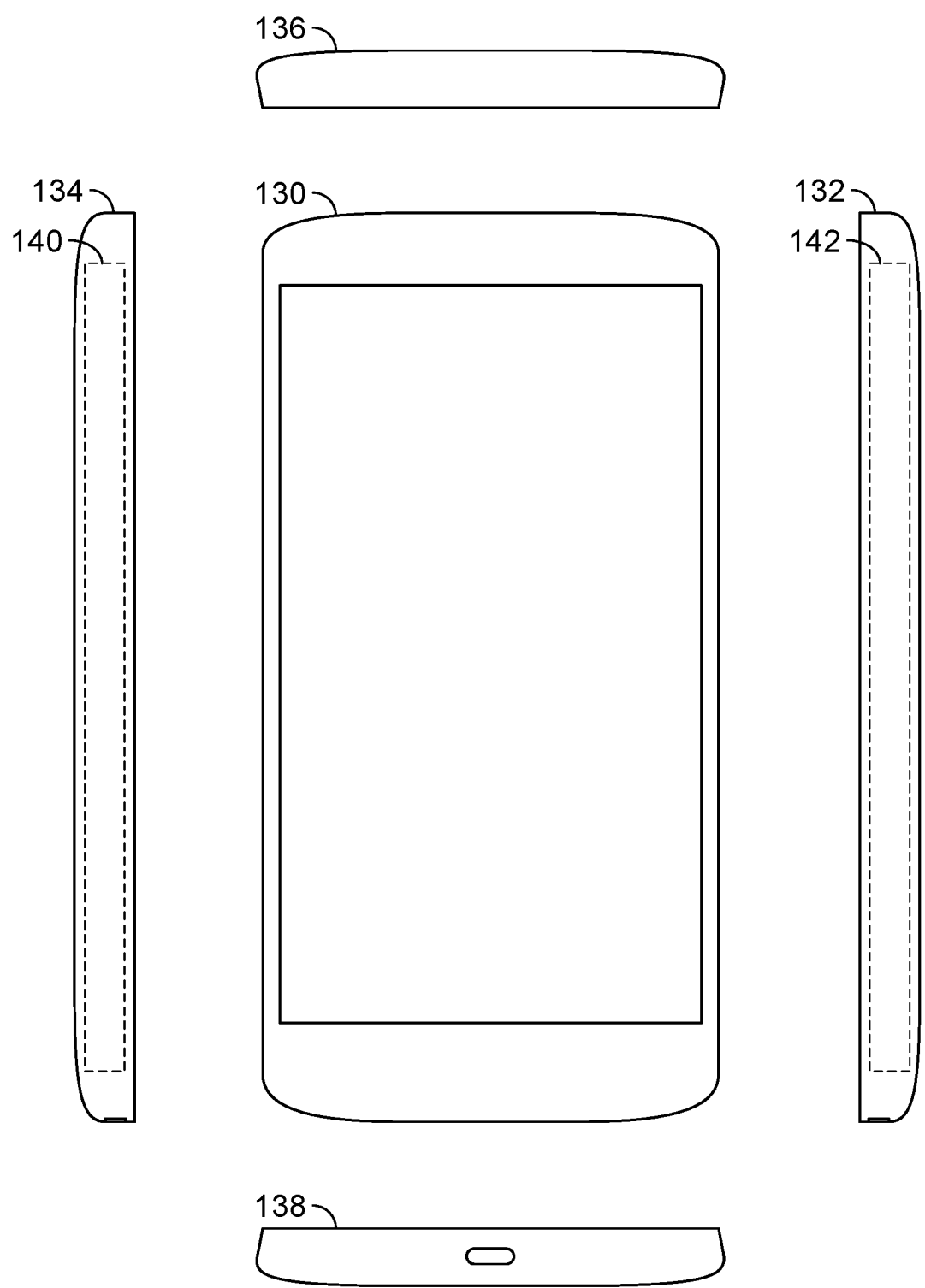
FIG. 1A is a diagram illustrating an embodiment of a device with touch input enabled housing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of techniques to detect a foreign substance which is not a touch (e.g., a water drop, some gel, a etc.) are described herein. First, some examples of a system which performs touch and/or force detection is described herein. These are some examples of a system which may perform the detection technique(s) described herein.

In some embodiments, a plurality of transmitters are coupled to a propagating housing medium and each transmitter is configured to emit a propagating signal through the propagating housing medium. A plurality of receivers are coupled to the propagating housing medium, wherein the receivers detect the propagating signals that have been disturbed by a touch input. The plurality of transmitters and the plurality of receivers are coupled to the propagating medium inline along a one-dimensional axis (e.g., lengthwise) of the propagating housing medium (at least in some embodiments). For example, when the propagating housing medium is touched at a point along the one-dimensional axis, the emitted signal propagating through the propagating housing medium is disturbed (e.g., the touch causes an interference with the propagated signal). By processing the received signals, a location and a force on the surface of the housing associated with the touch input are at least in part identified. Because the interaction between the material of the touch input and the propagated signal is utilized to detect the signal, a mechanical deflection of a sensor is not required to detect either the location or the force of the touch input. For example, the location and the force of a touch input are able to be detected on a rigid metal side of a smartphone without a use of a physical button or a physical strain gauge.

The one-dimensional axis (e.g., associated with a medium through which signals are transmitted and received) is not necessarily limited to plane geometry. In various embodiments, any straight line on a sphere, cylinder, or any other curved surface as a shortest path between two points on the surface, also known as a geodesic, comprises the one-dimensional axis associated with the medium.

In various embodiments, the touch input includes a physical contact to a surface using a human finger, pen, pointer, stylus, and/or any other body part or object that can be used to contact or disturb the surface. In some embodiments, the touch input includes an input gesture and/or a multi-touch input. In some embodiments, the received signal is used to determine one or more of the following associated with a touch input: a gesture, a coordinate position, a time, a time frame, a direction, a velocity, a force magnitude, a proximity magnitude, a pressure, a size, and other measurable or derived parameters.

Touch input detection described herein may be utilized to detect touch inputs on non-traditional surfaces such as metal that allows it to have applicability beyond touch screen displays. Various technologies have been traditionally used to detect a touch input on a display area. The most popular technologies today include capacitive and resistive touch detection technology. Using resistive touch technology, often a glass panel is coated with multiple conductive layers that register touches when physical pressure is applied to the layers to force the layers to make physical contact. Using capacitive touch technology, often a glass panel is coated with material that can hold an electrical charge sensitive to a human finger. By detecting the change in the electrical charge due to a touch, a touch location can be detected. However, with resistive and capacitive touch detection technologies, the glass screen is required to be coated with a material that reduces the clarity of the glass screen. Additionally, because the entire glass screen is required to be coated with a material, manufacturing and component costs can become prohibitively expensive as larger screens are desired.

Another type of touch detection technology includes bending wave technology. One example includes the Elo Touch Systems Acoustic Pulse Recognition, commonly called APR, manufactured by Elo Touch Systems of 301 Constitution Drive, Menlo Park, Calif. 94025. The APR system includes transducers attached to the edges of a touchscreen glass that pick up the sound emitted on the glass due to a touch. However, the surface glass may pick up other external sounds and vibrations that reduce the accuracy and effectiveness of the APR system to efficiently detect a touch input. Another example includes the Surface Acoustic Wave-based technology, commonly called SAW, such as the Elo IntelliTouch Plus™ of Elo Touch Systems. The SAW technology sends ultrasonic waves in a guided pattern using reflectors on the surface of the touch screen to detect a touch. However, sending the ultrasonic waves in the guided pattern increases costs and may be difficult to achieve. Additionally, because SAW must propagate on the surface, SAW transmitters and receivers are typically mounted on the same surface where a touch input is to be received. Detecting additional types of inputs, such as multi-touch inputs, may not be possible or may be difficult using SAW or APR technology.

FIG. 1A is a diagram illustrating different views of a device with touch input enabled housing. Front view 130 of the device shows a front display surface of the device. Left side view 134 of the device shows an example touch input external surface region 140 on a sidewall of the device where a touch input is able to be detected. For example, a location and a force of a user touch input are able to be detected in region 140 by detecting disturbances to transmitted signals in region 140. By touch enabling the side of the device, one or more functions traditionally served by physical buttons are able to be provided without the use of physical buttons. For example, volume control inputs are able to be detected on the side without the use of physical volume control buttons. Right side view 132 of the device shows touch input external surface region 142 on another sidewall of the device where a user touch input can be detected. Although regions 140 and 142 have been shown as smooth regions, in various other embodiments, one or more physical buttons, ports, and/or openings (e.g., SIM/memory card tray) may exist, or the region can be textured to provide an indication of the sensing region. Touch input detection may be provided over surfaces of physical buttons, trays, flaps, switches, etc. by detecting transmitted signal disturbances to allow touch input detection without requiring detection of physical movement/deflection of a component of the device (e.g., detect finger swiping over a surface of a physical button). In some embodiments, the touch input regions on the sides may be divided into different regions that correspond to different functions. The touch input provided in region 140 (and likewise in region 142) is detected along a one-dimensional axis. For example, a touch location is detected as a position on its lengthwise axis without differentiating the width of the object touching the sensing region. In an alternative embodiment, the width of the object touching the sensing region is also detected. Regions 140 and 142 correspond to regions beneath which touch input transmitters and sensors are located. Although two touch input regions on the housing of the device have been shown in FIG. 1A, other touch input regions on the housing may exist in various other embodiments. For example, surfaces on top (e.g., surface on top view 136) and/or bottom (e.g., surface on bottom view 138) of the device are touch input enabled. The shapes of touch input surfaces/regions on device sidewalls (e.g., regions 140 and 142) may be at least in part flat, at least in part curved, at least in part angular, at least in part textured, and/or any combination thereof.

Figure 1B:
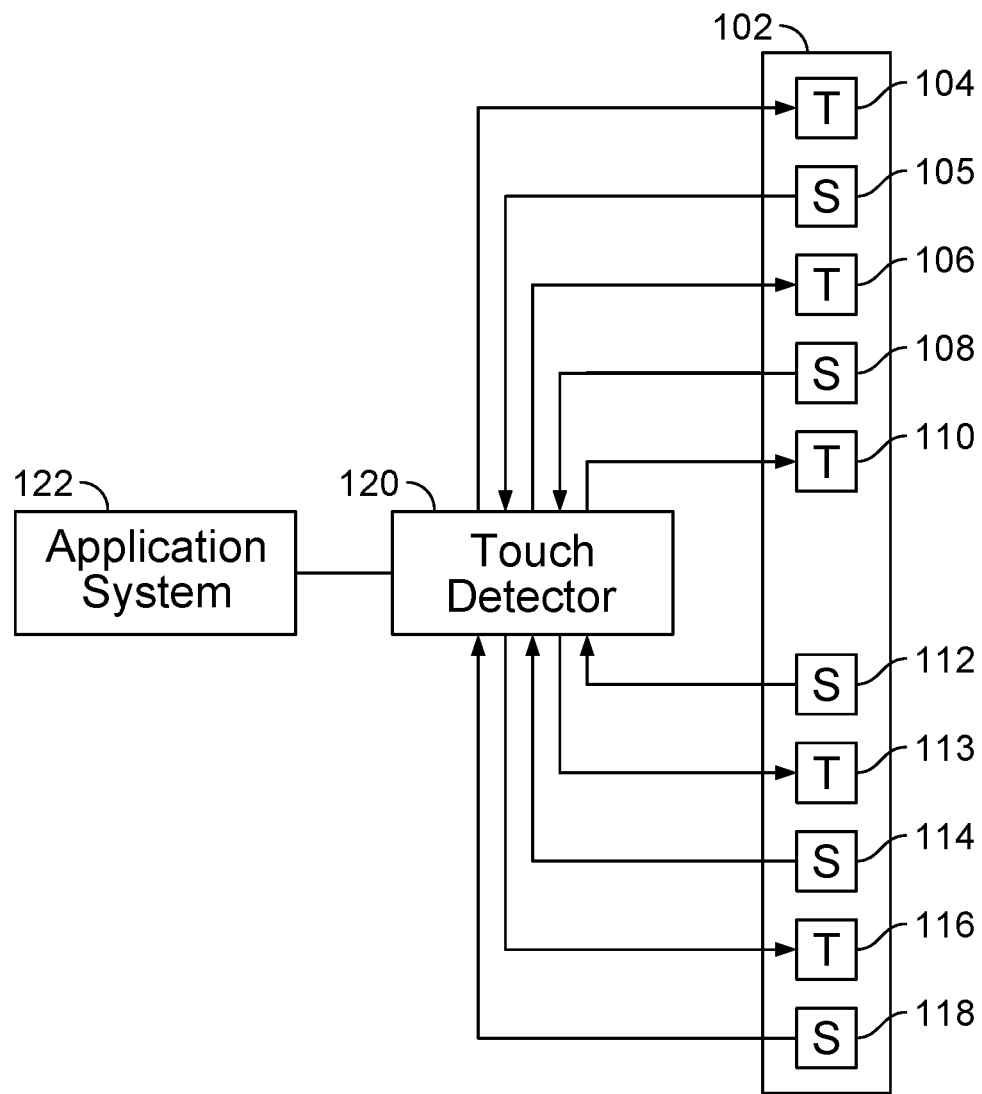
FIG. 1B is a block diagram illustrating an embodiment of a system for detecting a touch input surface disturbance.

FIG. 1B is a block diagram illustrating an embodiment of a system for detecting a touch input surface disturbance. In some embodiments, the system shown in FIG. 1B is included in the device shown in FIG. 1A. For example, FIG. 1B shows components utilized to detect a touch input on a sidewall external surface 140 of FIG. 1A. In some embodiments, the system shown in FIG. 1B is included in a computing device, an entertainment device, a smartphone, a tablet computer, a point of sale terminal, a food and restaurant apparatus, a gaming device, a casino game and application, a piece of furniture, a vehicle, an industrial application, a financial application, a medical device, an appliance, and any other object or device having a touch input surface. Propagating signal medium 102 is coupled to transmitters 104, 113, 106, 116, and 110 and receivers/sensors 105, 108, 112, 114, and 118. The locations where transmitters 104, 113, 106, 116, and 110 and sensors 105, 108, 112, 114, and 118 are located with respect to propagating signal medium 102 and with respect to each other, as shown in FIG. 1B, are merely an example. Likewise, the number of transmitters and receivers need not be equal. In some embodiments, propagating signal medium 102 is a part of a housing of a device. For example, the transmitters and receivers are coupled to a sidewall of a housing of a smartphone device to detect touch inputs on the side of the device. In some embodiments, the shown portion of propagating signal medium 102 corresponds to touch input region 140 of FIG. 1A. For example, the shown elongated region of medium 102 corresponds to a region of a side of a smartphone device where touch input is able to be provided.

Other configurations of transmitter and sensor locations may exist in various embodiments. Although FIG. 1B shows alternating transmitters and receivers arranged inline, locations of transmitters and sensors may be intertwined and spaced and arranged in any configuration in various other embodiments. The gap between transmitter 110 and sensor 112 may correspond to a location where a SIM/memory card opening is to be located. Any number of transmitters and/or sensors may be utilized in various embodiments. In some embodiments, rather than using a dedicated transmitter and a dedicated sensor, a transducer that acts as both a transmitter and a sensor is utilized. In various embodiments, the propagating medium includes one or more of the following materials: polymer, plastic, wood, steel, metal, and any medium that is able to propagate an acoustic or ultrasonic signal. For example, medium 102 is a portion of a metal sidewall/side-edge of a smartphone or a tablet computer device where a user is to hold the device. FIG. 1B only shows transmitters and sensors for one side of a device as an example and another set of transmitters and sensors may be placed on another side of the device to detect inputs on this other side of the device (e.g., also connected to touch detector 120). Objects of FIG. 1B are not drawn to scale.

Medium 102 includes a surface area where a user may touch to provide a command input. In various embodiments, the touch input surface of medium 102 is flat, curved, or combinations thereof. The touch input is to be detected along a lengthwise region (e.g., locations in the region to be only identified along a one-dimensional axis). A one-dimensional location and a force of a touch input along an external sidewall surface of the device may be detected without actuation of a physical button or use of any other sensor that requires a physical deflection/movement of a component of the device. For example, a user provides an input on the external surface of medium 102 that covers the shown transmitters and receivers that are mounted on an opposite internal surface/side of medium 102 (e.g., mounted on an internal side of the device sidewall inside a device and the touch input is provided on the other side of the device sidewall that is the external surface of the device sidewall) and the input disturbs a transmitted signal traveling within medium 102 (e.g., by at least one of the shown transmitters) that is detected (e.g., by at least one of the shown sensors) and analyzed to identify a location on the external surface of medium 102 where the input was provided. This allows virtual buttons to be provided on a smooth side surface and an indication of a virtual button press is detected when a user applies pressure of sufficient force at a specific location of a virtual button on the side surface region. In some embodiments, a length of the axis where a touch input is able to be detected starts from an external surface over a mounting location of transmitter 104 to an external surface over a mounting location of sensor 118.

Examples of transmitters 104, 106, 110, 113, and 116 include piezoelectric transducers, electromagnetic transducers, transmitters, sensors, and/or any other transmitters and transducers capable of propagating a signal through medium 102. Examples of sensors 105, 108, 112, 114, and 118 include piezoelectric transducers, electromagnetic transducers, laser vibrometer transmitters, and/or any other sensors and transducers capable of detecting a signal on medium 102. Although five transmitters and five sensors are shown, any number of transmitters and any number of sensors may be used in other embodiments. In the example shown, transmitters 104, 106, 110, 113, and 116 each may propagate a signal through medium 102. A signal emitted by a transmitter is distinguishable from another signal emitted by another transmitter. In order to distinguish the signals, a phase of the signals (e.g., code division multiplexing), a frequency range of the signals (e.g., frequency division multiplexing), or a timing of the signals (e.g., time division multiplexing) may be varied. One or more of sensors 105, 108, 112, 114, and 118 receive the propagated signals.

Touch detector 120 (e.g., included and mounted on an internal circuit board) is connected to at least the transmitters and sensors shown in FIG. 1B. In some embodiments, detector 120 includes one or more of the following: an integrated circuit chip, a printed circuit board, a processor, and other electrical components and connectors. Detector 120 determines and sends signals to be propagated by transmitters 104, 106, 110, 113, and 116. Detector 120 also receives the signals detected by sensors 105, 108, 112, 114, and 118. The received signals are processed by detector 120 to determine whether a disturbance associated with a user input has been detected at a location on a surface of medium 102 associated with the disturbance. Detector 120 is in communication with application system 122. Application system 122 uses information provided by detector 120. For example, application system 122 receives from detector 120 a location identifier and a force identifier associated with a user touch input that is used by application system 122 to control configuration, settings or function of a device, operating system, and/or application of application system 122. For example, a user indication to increase volume is detected when a touch input of sufficient pressure is detected within one range of locations along a one-dimensional axis, while a user indication to decrease volume is detected when an input of sufficient pressure is detected within another range of locations. Such regions can be fixed, or can be defined in software. For example, a right-handed user could have a region to change volume assigned to the detection region on the left side of the case, whereas a left-handed user could reverse this assignment.

In some embodiments, application system 122 includes a processor and/or memory/storage. In other embodiments, detector 120 and application system 122 are at least in part included/processed in a single processor. An example of data provided by detector 120 to application system 122 includes one or more of the following associated with a user indication: a location coordinate along a one-dimensional axis, a gesture, simultaneous user indications (e.g., multi-touch input), a time, a status, a direction, a velocity, a force magnitude, a proximity magnitude, a pressure, a size, and other measurable or derived information.

Figure 1C:
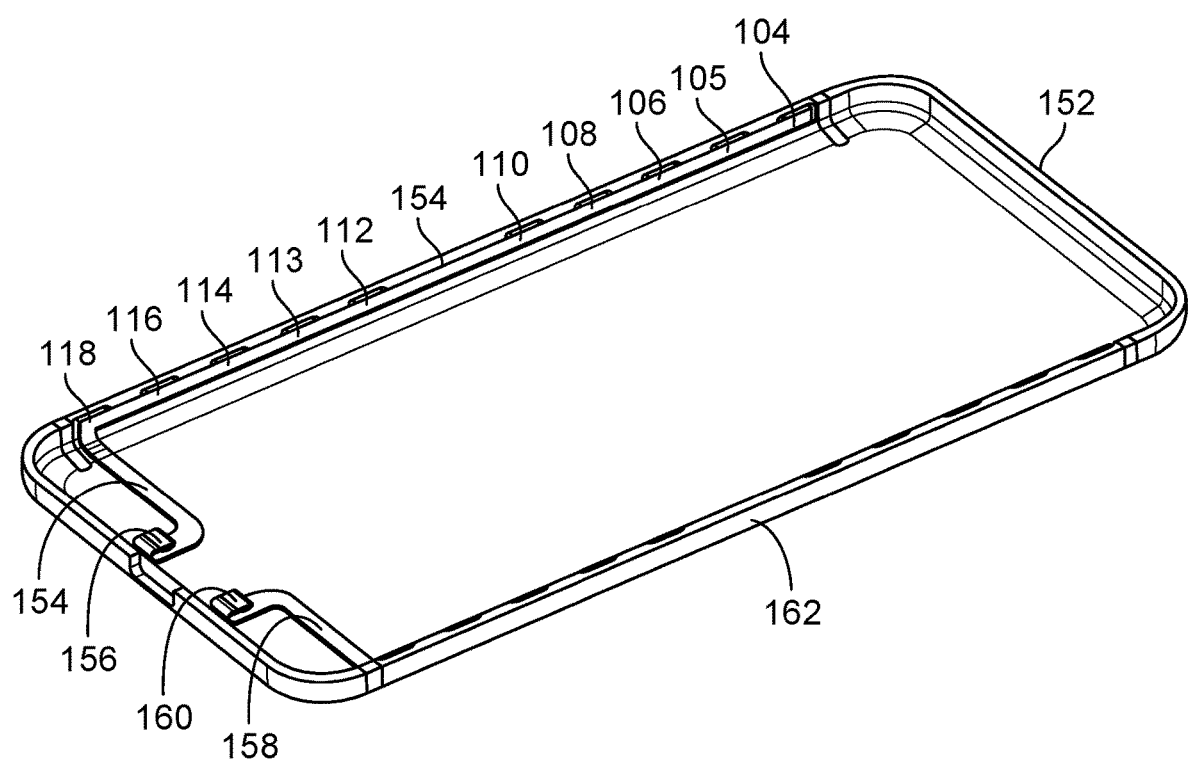
FIG. 1C is a diagram illustrating an embodiment of a device housing with touch input enabled sides.

FIG. 1C is a diagram illustrating an embodiment of a device housing with touch input enabled sides. Housing 152 shows a unibody back and side housing of an electronic device. For example, housing 152 may be utilized as a part of a housing for a smartphone device that houses electrical components and is covered with a display glass surface.

Transmitters 104, 106, 110, 113, and 116 and sensors 105, 108, 112, 114, and 118 (also shown in FIG. 1B) have been mounted on an internal side/surface of a sidewall (e.g., sidewall internal surface/side facing inside the electronic device) of housing 152. Housing 152 may be made of metal (e.g., aluminum), plastics, ceramics, carbon fiber, or any other material of propagating medium 102 of FIG. 1B. The transmitters and sensors are mounted on flex cable 154. Flex cable 154 includes patterned conductors that connect the transmitters and sensors/receivers to pins on connector 156. In some embodiments, connector 156 connects to a circuit board (not shown) that includes a touch detector (e.g., touch detector 120) that provides/receives signals to/from the transmitters/receivers. The transmitters and sensors/receivers of flex cable 154 are utilized to detect touch input on an external side surface of housing 152 over the region directly above and between the transmitters and sensors/receivers of flex cable 154 (e.g., to detect location and force along a one-dimensional axis identifying lengthwise locations on the external side surface). This allows the side surface of housing 152 to be touch sensitive to user inputs. Although housing 152 does not show any physical buttons in the touch input surface, in various other embodiments, one or more physical buttons may exist. For example, touch input detection may be provided on a surface of a physical button (e.g., transmitter/sensor mounted behind/around a physical button) to allow a user to provide a touch indication over a surface of a physical button without physically actuating the physical button (e.g., detect swipe gesture over physical button).

Much like flex cable 154, flex cable 158 connects transmitters and sensors mounted on a second internal surface/side of a second sidewall (e.g., sidewall internal surface/side facing inside cavity of the electronic device) to connector 160 (e.g., connects to the circuit board that includes touch detector 120 of FIG. 1B). The transmitters and sensors/receivers of flex cable 158 are utilized to detect touch input on external side surface 162 of housing 152 over the region directly above and between the transmitters and sensors/receivers of flex cable 158. This allows sidewall surface 162 to be touch sensitive to user inputs. In various embodiments, other transmitters and sensors/receivers may be mounted on other internal walls and surfaces of housing 152 to allow touch inputs on other external surfaces of housing 152.

Figure 1D:
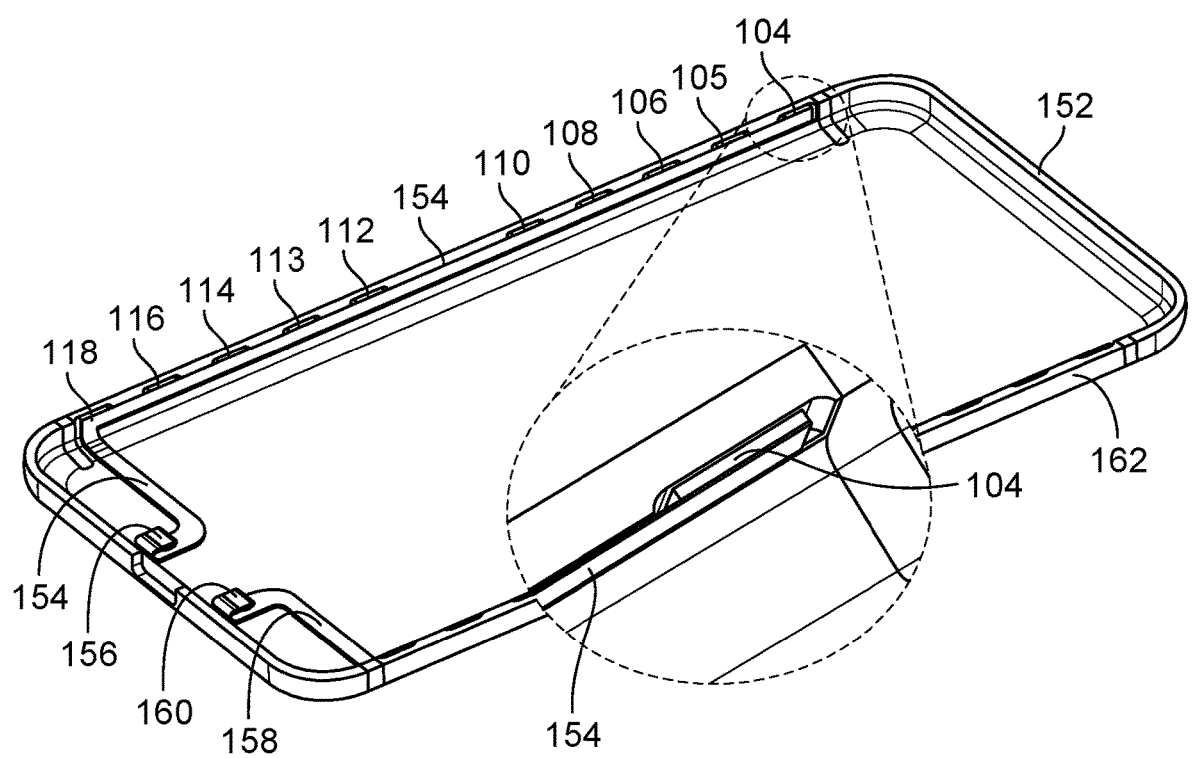
FIG. 1D shows an embodiment of a cavity and/or pocket.
Figure 1E:
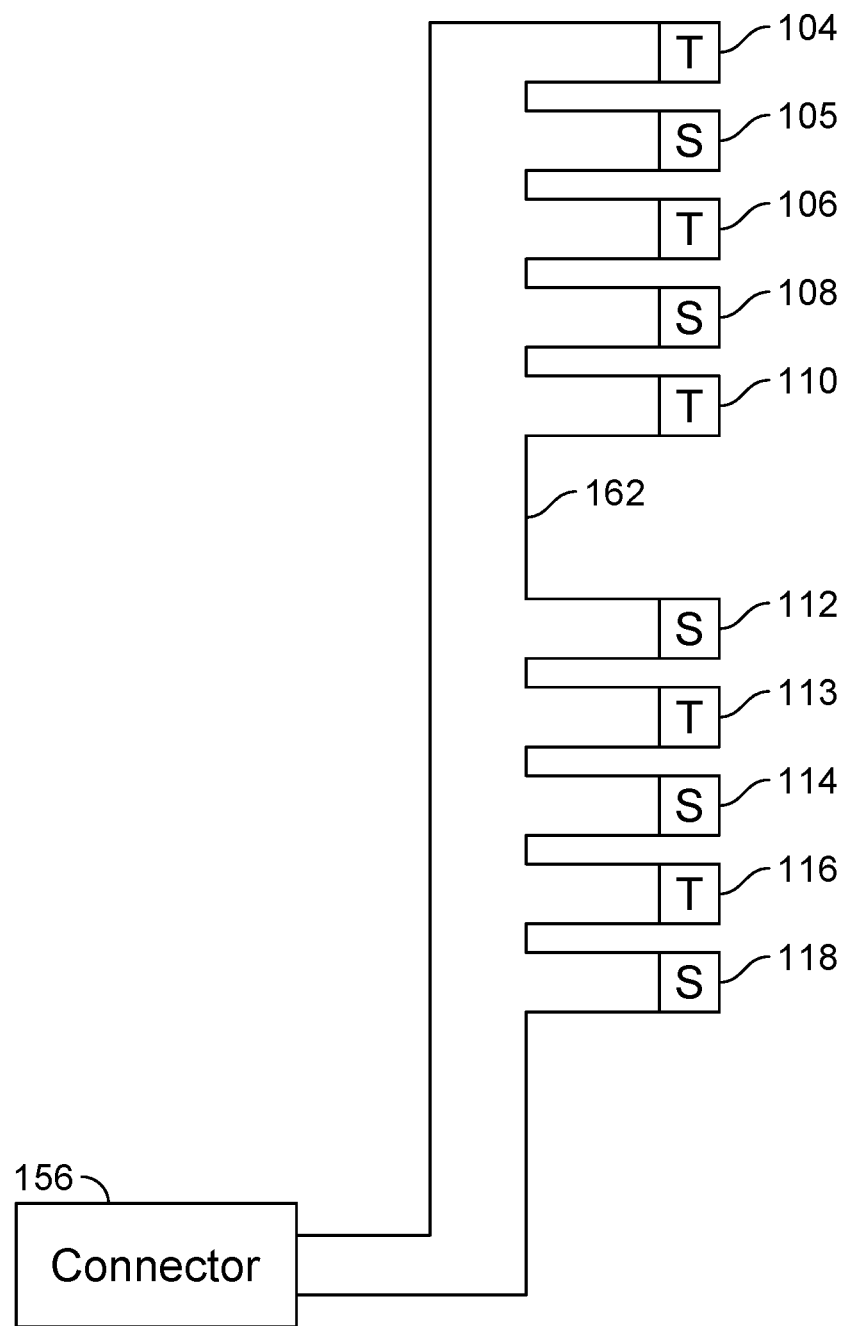
FIG. 1E shows an embodiment of transmitters and receivers mounted on fingers of a flex cable.

Although the shown transmitters and sensors/receivers have been directly mounted on flex cable 154 in a straight line along a strip/bar of flex cable 154, the sensors/receivers and transmitters may be mounted on a flex cable in various other embodiments. For example, FIG. 1E shows transmitters and receivers mounted on fingers of flex cable 162. This may allow flexibility in routing the flex cable around other internal components of a device. For example, the fingers allow the flex cable to be routed around openings and components to accommodate a switch, button, SIM/memory card tray, etc.

When manufacturing the configuration shown in FIG. 1C, it may be inefficient to individually attach each individual transmitter/sensor onto a flex cable. In some embodiments, transmitters and sensors are positioned/placed on a stiffener bar (e.g., mounting template bar) that assists in the positioning and alignment of the transmitters and sensors and all of the transmitters and sensors on the stiffener bar are attached to a flex cable together at the same time using the stiffener bar. Once transmitters/sensors are attached to the flex cable, each of the transmitters/sensors on the flex cable are attached to the propagating medium/housing via an adhesive (e.g., epoxy). The transmitters and sensors shown in the example of FIG. 1C have been placed inside cavities/pockets etched on the internal side/surface of the sidewall of housing 152. FIG. 1D shows a magnified view of the cavity/pocket (e.g., 0.3 millimeter in depth). By placing each transmitter/sensor in the cavity, valuable internal space inside the housing is maintained and the flex cable assembly with the transmitters and receivers is able to be mounted flush to the sidewall.

Figure 2:
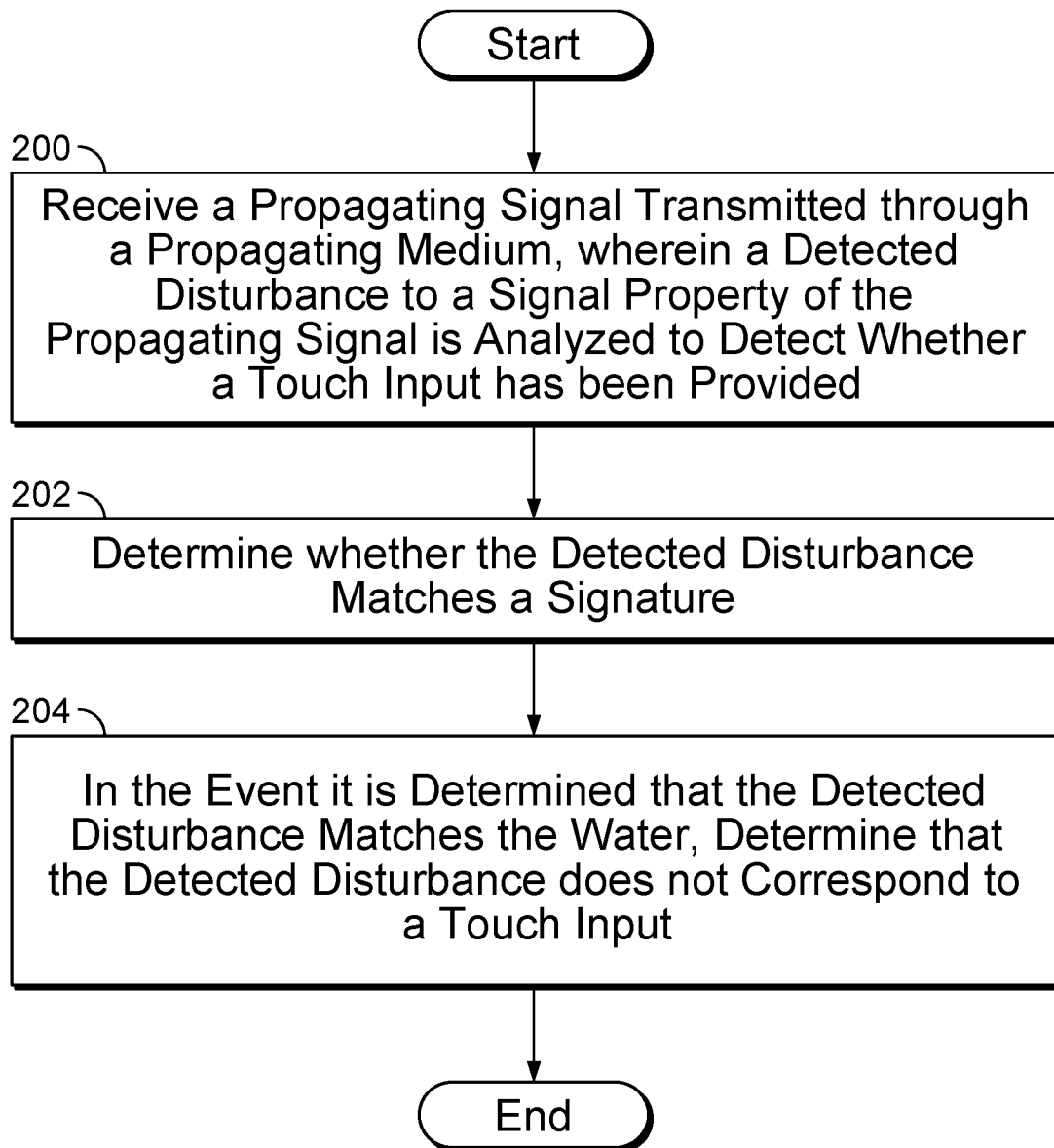
FIG. 2 is a diagram illustrating an embodiment of a process to detect a substance using a signature where a touch input is not declared if the signature is matched.

FIG. 2 is a diagram illustrating an embodiment of a process to detect a substance using a signature where a touch input is not declared if the signature is matched. In some embodiments, the process is performed by a mobile device that has one or more touch surfaces (see, e.g., FIG. 1A). Some touch detection processes may incorrectly identify substances on the touch surface (e.g., water drops) as touches (e.g., because they have certain similar characteristics), and the example process may be used to override or eliminate detected false touches from substances having certain properties.

At 200, a propagating signal transmitted through a propagating medium is received, wherein a detected disturbance to a signal property of the propagating signal is analyzed to detect whether a touch input has been provided. FIG. 1B shows one example of transmitters (e.g., 104, 106, etc.) which may transmit the propagating signal and receivers (e.g., 105, 108, etc.) which may receive the propagating signal. As described above, the propagating signal may be an acoustic or ultrasonic signal. In some embodiments, the propagating signal's amplitude is analyzed (e.g., by comparing it against an amplitude reference from reference data) to detect whether a touch input has occurred. Water drops, as well as touches, absorb some of the propagating signal and so both have a propagating signal with reduced (i.e., attenuated) amplitude. For this reason, some touch detection processes mistake water drops (or other substances) for touches.

At 202, it is determined whether the detected disturbance matches a signature. In some embodiments, the signature includes or is associated with phase. For example, as will be described in more detail below, water drops (unlike touches) tend to affect the phase of the propagating signal. Therefore, in some embodiments, a signature examines the phase of the propagating signal (e.g., by comparing it against a phase reference from reference data) in order to identify water or some other substance. In various embodiments, water in contact with the propagating medium comes from a variety of sources including condensation, rain, direct transfer (e.g., from wet hands), etc. Other substances may also have this effect on the phase or (other signal characteristics) and a signature may search for any combination and/or range of signal characteristics or properties.

At 204, in the event it is determined that the detected disturbance matches the signature, it is determined that the detected disturbance does not correspond to a touch input. In other words, if the signature is matched, any touch which is identified is overridden or suppressed.

In some embodiments, the process of FIG. 2 is performed (e.g., independently) for every gap between adjacent transceivers. For example, a touch detection process (e.g., which cannot differentiate between water (as an example) and touches) may generate a touch detected signal for each gap between adjacent transceivers. Correspondingly, a water detection process (as an example) generates a water detected signal for each gap to override (e.g., where/when needed) the touch detected signal.

The following figures describe some examples of a signature.

Figure 3:
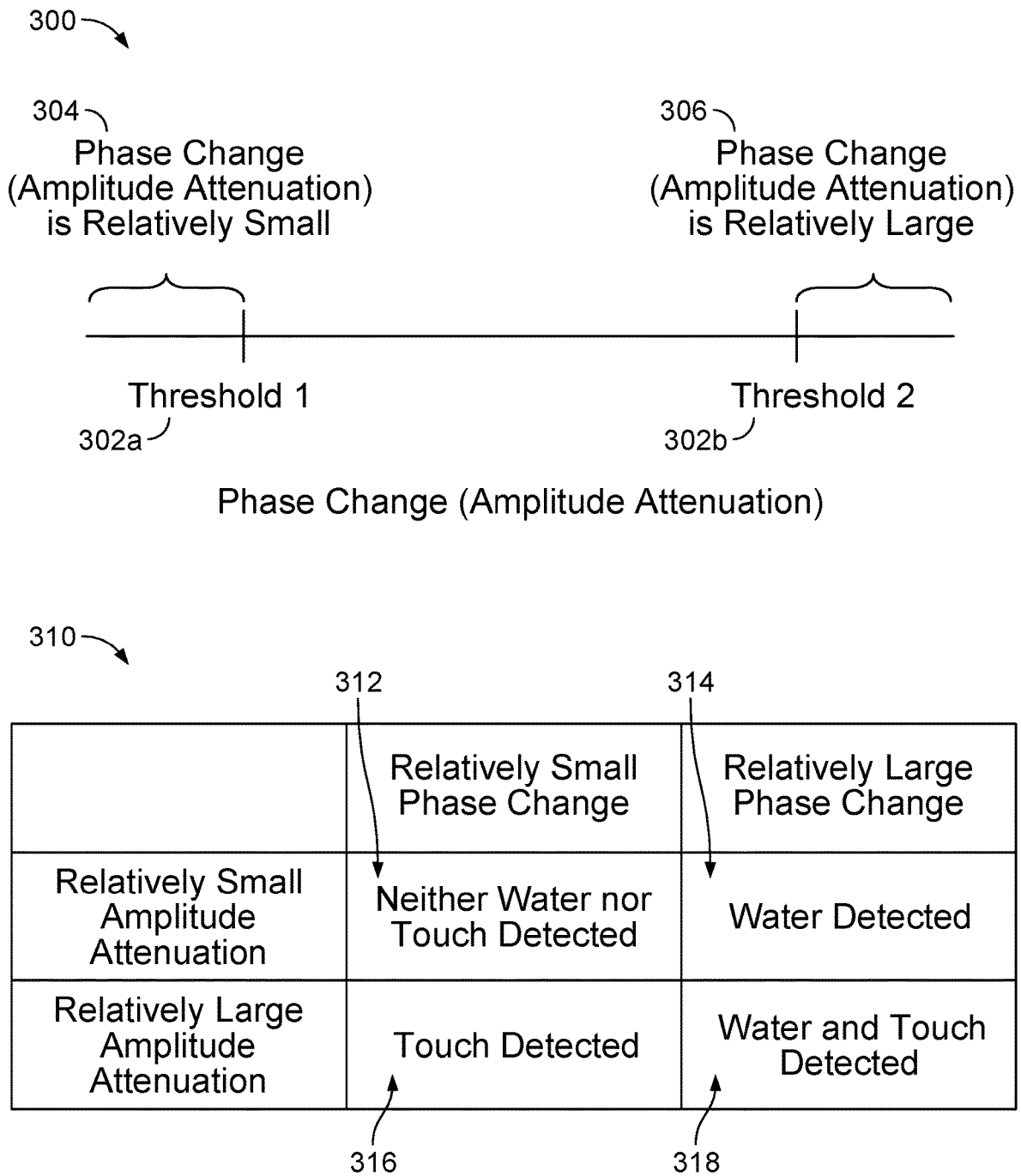
FIG. 3 is a diagram illustrating a table of various phase change and amplitude attenuation scenarios.

FIG. 3 is a diagram illustrating a table of various phase change and amplitude attenuation scenarios. In some embodiments, the presence of some other foreign substance (e.g., besides water) which does not comprise a touch is detected using a signature.

In the table shown (310), the columns of the table describe two possible phase change scenarios: a relatively small phase change and a relatively large phase change. For example, a degree or amount of phase change may be obtained by comparing the phase from a (e.g., current) propagating signal against a phase reference from reference data (e.g., where the reference data is a copy of a previously received propagating signal). One or more thresholds may be used to classify the phase change as relatively small versus relatively large. See, for example, diagram 300 where a first, lower threshold (302a) is used to classify the phase change as relatively small (304) and a second, higher threshold (302b) is used to classify the phase change as relatively large (306).

The rows of the table correspond to two possible amplitude attenuation scenarios: a relatively small amplitude attenuation and a relatively large amplitude attenuation. For brevity, amplitude gain is not considered or shown in the table (e.g., where the amplitude of the propagating signal is larger than an amplitude reference). The amplitude from a (e.g., current) propagating signal may be compared against an amplitude reference (e.g., from reference data) in order to obtain a degree or amount of amplitude attenuation. Two more thresholds may be used to classify the amplitude attenuation as relatively small (e.g., where the amplitude of the propagating signal only decreased by a relatively small amount compared to the amplitude reference) versus relatively large amplitude attenuation (e.g., where the amplitude of the propagating signal decreased by quite a bit compared to the amplitude reference).

Each of the table entries shows the corresponding decision for that particular combination of phase change and amplitude attenuation. If both the phase change and the amplitude attenuation are relatively small (312), then neither water nor a touch is detected or otherwise identified. As described above, the touch tends to absorb the propagating signal, which shows up as amplitude attenuation so a relatively small amount of amplitude attenuation is not identified as a touch (e.g., to avoid false positives). Water tends to manifest itself as a change in the phase and so if there is only a relatively small amount of phase change, then no water is identified (e.g., to again avoid false positives).

If the phase change is relatively large and the amplitude attenuation is relatively small (314), then water is detected or otherwise identified (i.e., and no touch is detected or otherwise identified). There is no significant amplitude attenuation so there is likely no touch, but the significant phase change is indicative of water.

If the phase change is relatively small and the amplitude attenuation is relatively large (316), then a touch is detected or otherwise identified (i.e., and no water is detected or otherwise identified).

If the phase change is relatively large and the amplitude attenuation is relatively large (318), then water is detected and a touch is detected. That is, there is water on the propagating medium, but there is also a touch on the propagating medium. For example, the user could be touching the propagating medium with wet hands and so there are some valid scenarios where there is both water and a touch present on the touch surface.

Depending upon how a water detected signal is used (e.g., by downstream logic and/or processes), a signature may attempt to identify when scenario 314 or scenario 318 occurs (e.g., the union of the two) or when scenario 314 (e.g., alone) occurs. An example of the former is first described and then an example of the latter is described.

Figure 4:
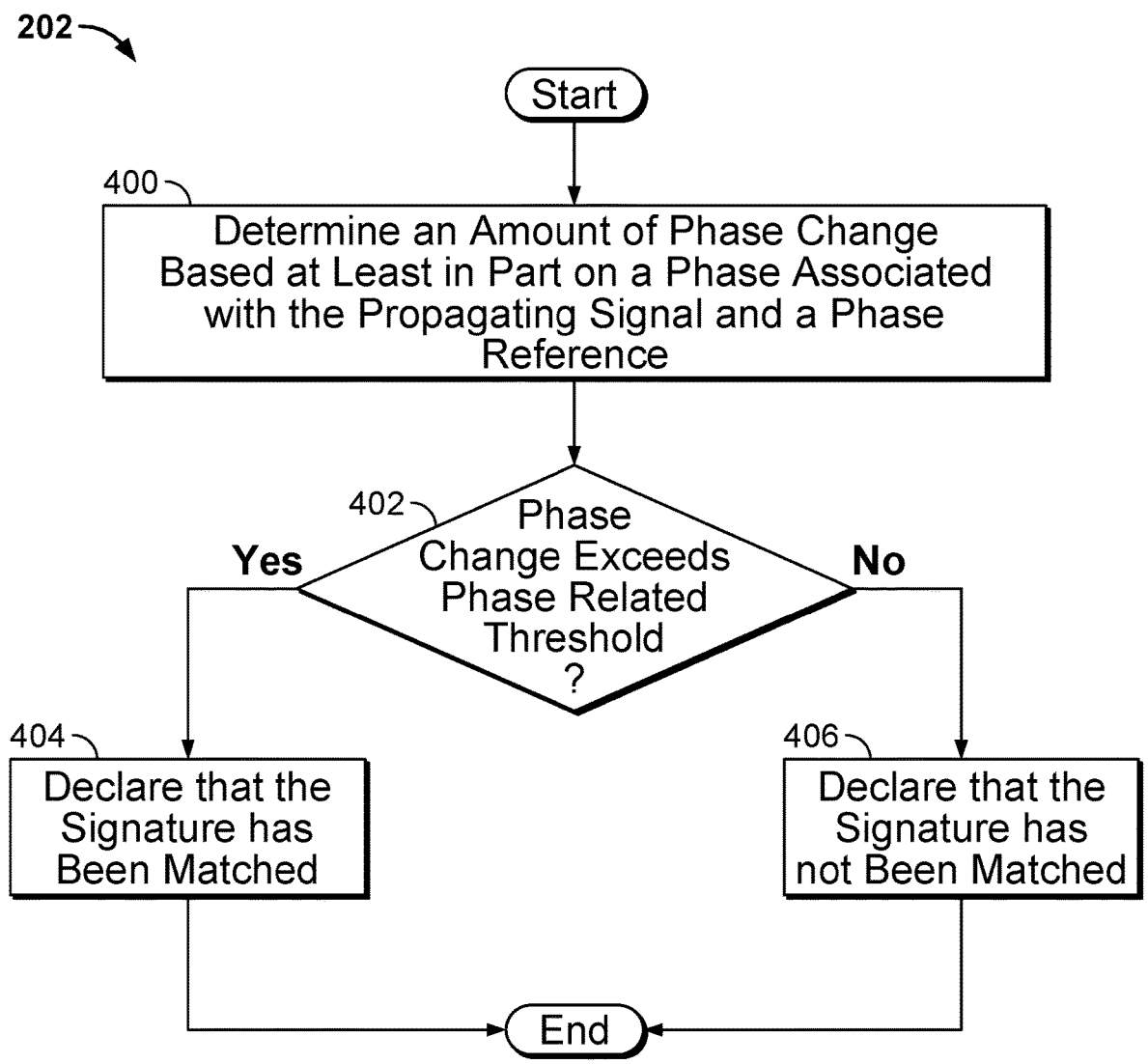
FIG. 4 is a flowchart illustrating an embodiment of a process to determine whether a signature is matched where the signature checks for a relatively large phase change.

FIG. 4 is a flowchart illustrating an embodiment of a process to determine whether a signature is matched where the signature checks for a relatively large phase change. In some embodiments, the process of FIG. 4 is used at step 202 in FIG. 2. In one example, if water is present on the propagating medium (e.g., even if there is also a touch on the propagating medium), it may be a bad time to update reference data because doing so would corrupt the reference data, causing touch detection logic and/or water detection logic to subsequently make improper and/or undesirable decisions. In such applications, the exemplary signature described below may be used.

At 400, an amount of phase change is determined based at least in part on a phase associated with the propagating signal and a phase reference. For example, a copy of a previously received propagating signal may be stored as reference data. From the reference data, a phase reference may be obtained which is then compared against the phase of the propagating signal in order to determine the amount of phase change. In some embodiments, a phase reference and/or reference data is stored for each transmitter-receiver pair in the system (e.g., which is being listened to and not ignored).

In some embodiments, the amount of phase change detected or otherwise determined at step 400 is due to or otherwise results from a time shift, such as a propagation delay, where phase (change) is used as a proxy for time (change or shift). Conceptually, a small time shift can look like a phase shift, so phase can be used in lieu of measuring the time shift.

At 402, it is determined if the phase change exceeds a phase related threshold. Using FIG. 3 as an example, a relatively large phase change may be looked for at step 402 and the second, upper threshold (302b) may be used in the determination at step 402.

If it is determined at step 402 that the phase change exceeds the phase related threshold, then it is declared that the signature has been matched at 404. For example, scenario 314 and scenario 318 in FIG. 3 would follow this path.

Or, if it is determined at step 402 that the phase change does not exceed the phase related threshold, then it is declared that the signature has not been matched at 406. For example, scenario 312 and scenario 316 in FIG. 3 would follow this path.

Figure 5:
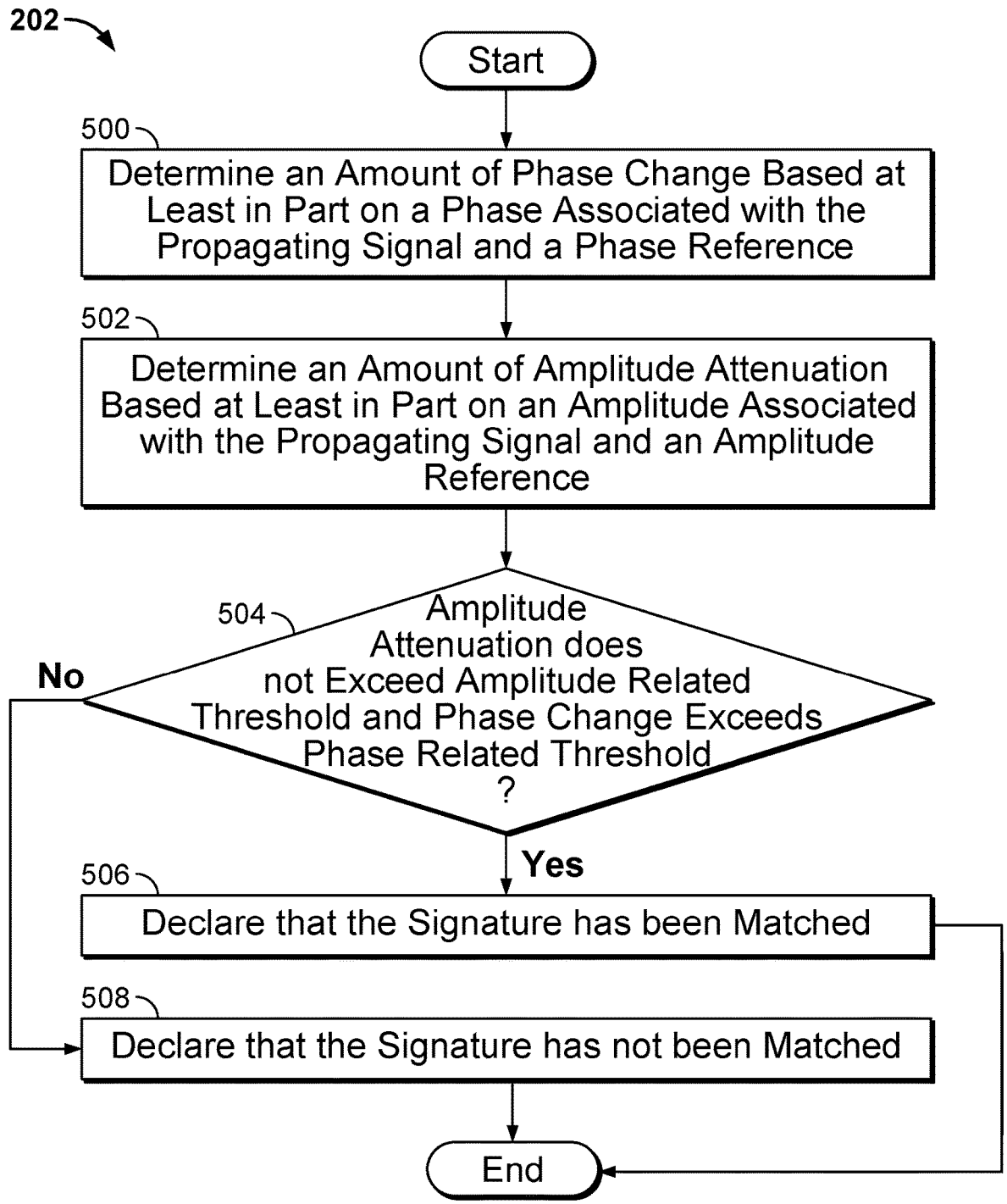
FIG. 5 is a flowchart illustrating an embodiment of a process to determine whether a signature is matched where the signature checks for a relatively large phase change and a relatively small amplitude attenuation.

FIG. 5 is a flowchart illustrating an embodiment of a process to determine whether a signature is matched where the signature checks for a relatively large phase change and a relatively small amplitude attenuation. In some embodiments, the process of FIG. 5 is used at step 202 in FIG. 2. This process may be used in embodiments where a water detection signal that asserts in scenario 314 in FIG. 3, but not in scenario 318, is desired. For example, if a water detected signal is used to override a touch detected signal, then it may be undesirable for the water detected signal to be asserted during scenario 318 in FIG. 3 since that scenario should be identified as a touch. As described above, in some embodiments, some other (e.g., foreign) substance besides water is detected.

At 500, an amount of phase change is determined based at least in part on a phase associated with the propagating signal and a phase reference. At 502, an amount of amplitude attenuation is determined based at least in part on an amplitude associated with the propagating signal and an amplitude reference. For brevity, this example process does not check or otherwise confirm if the amplitude change comprises an amplitude attenuation (e.g., as opposed to an amplitude gain) but rather assumes that there is amplitude attenuation.

At 504, it is determined if the amplitude attenuation does not exceed an amplitude related threshold and the phase change exceeds a phase related threshold. To use FIG. 3 as an example, the check at step 504 is trying to determine if scenario 314 has occurred where there is a relatively small amplitude attenuation and a relatively large phase change.

If the check at step 504 passes, then it is declared that signature has been matched at step 506. For example, scenario 314 in FIG. 3 would follow this path. If the check at step 504 does not pass, it is declared that the signature has not been matched at step 508. For example, scenario 312, scenario 316, and scenario 318 in FIG. 3 would follow this path.

In some embodiments, a shared receiver configuration is used where there is an N:1 ratio of transmitters and receivers. To put it another way, each receiver listens for and/or is paired with two or more transmitters. The following figure describes one shared received embodiment.

Figure 6:
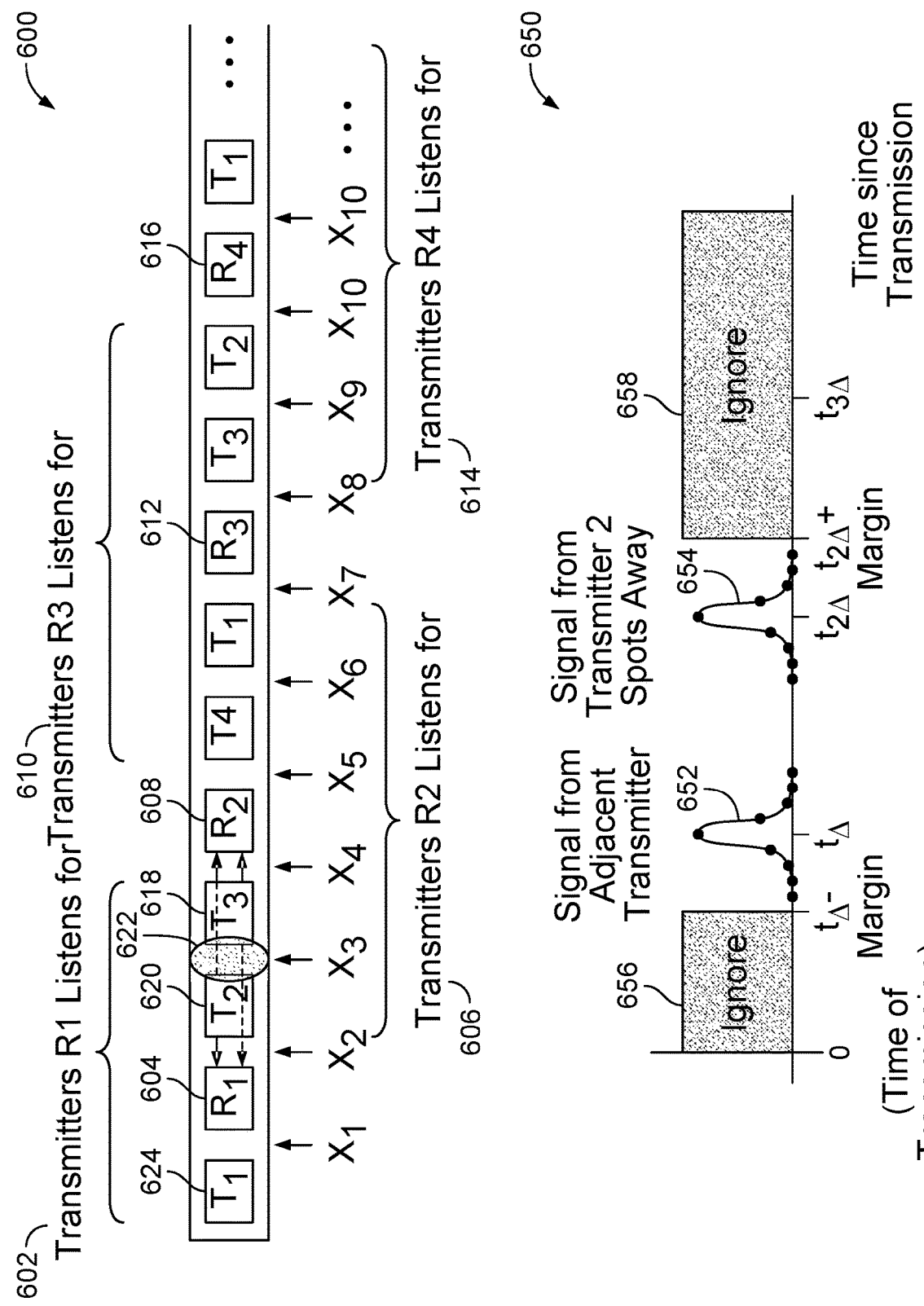
FIG. 6 is a diagram illustrating an embodiment of a side of a phone with a shared receiver configuration.

FIG. 6 is a diagram illustrating an embodiment of a side of a phone with a shared receiver configuration. Diagram 600 shows the exemplary transmitters and receivers laid out along the side of a phone. In this example, each receiver is associated with and listens to some number of transmitters. Group 602 shows the transmitters that receiver $R_1$ (604) listens for, group 606 shows the transmitters that receiver $R_2$ (608) listens for, group 610 shows the transmitters that receiver $R_3$ (612) listens for, and group 614 shows the transmitters that receiver $R_4$ (616) listens for.

In this example, the transmitters and receivers are configured to exchange an acoustic or ultrasonic signal. Such signals may be desirable because they work well in a variety of propagating mediums, including ones that have not worked well with previous touch and/or force sensing techniques. For example, the sides of some phones are made of metal, which does not work well with existing touch and/or force sensors which rely upon capacitors (e.g., because of the stiffness of the metal and/or the conductive properties of the metal). In contrast, acoustic or ultrasonic signals can propagate through metal relatively easily. In some embodiments, piezoelectric transducers are used for the transmitters and/or receivers.

In this example, transmitters with the same index use the same time-shifted pseudorandom binary sequence to transmit their signal. That is, all $T_1$ transmitters use a pseudorandom binary sequence with a first time shift, all $T_2$ transmitters use the same pseudorandom binary sequence but with a second time shift, and so on. Using time-shifted pseudorandom binary sequences permits orthogonality between transmitters with different indices and other techniques to provide orthogonality between transmitters with different indices may be used.

To ensure that only the appropriate signals from the appropriate transmitters are analyzed downstream, in some embodiments, filtering (e.g., based on propagation time) is performed so that signals from more distant transmitters (e.g., which are not part of a receiver's group) are ignored. Diagram 650 shows an example of the filtering performed to filter out signals transmitted by transmitters which are not of interest to a given receiver. For clarity and ease of explanation, suppose that all of the transmitters transmit at time 0. The propagation medium and its properties are known ahead of time (e.g., it is known that the side of a phone will be made of metal) and so the propagation time of a signal from a given transmitter to a given receiver is known. As used herein, $t_A$ is the propagation time of a signal from a transmitter to an adjacent receiver (e.g., from transmitter $T_3$ (618) to receiver $R_2$ (608)). Similarly, $t_{2A}$ is the propagation time of a signal from a transmitter to a receiver which is two places or spots away (e.g., from transmitter $T_2$ (620) to receiver $R_2$ (608)).

Again for clarity and ease of explanation, the transmission signals (652 and 654) in this example are represented as relatively short pulses; note that they occur or otherwise arrive at time $t_A$ and $t_{2A}$. Given the propagation times described above, the signal (652) from an adjacent transmitter (e.g., from $T_3$ (618) to receiver $R_2$ (608)) arrives at the receiver at time $t_A$. The signal (654) from a transmitter two spots away arrives at the receiver at time $t_{2A}$ (e.g., from transmitter $T_2$ (620) to receiver $R_2$ (608)).

As shown in diagram 650, filtering (656) is performed from time 0 to time ($t_A$−margin). Filtering (658) is also performed from time ($t_{2A}$+margin) onwards. This causes any signal received before ($t_A$−margin) or after ($t_{2A}$+margin) to be ignored. As a result, only signals which are received between $t_A$ (minus some margin) and $t_{2A}$ (plus some margin) are further analyzed and/or processed by downstream processing.

This filtering helps to prevent a signal from a distant transmitter (e.g., which is not part of a receiver's group) from being analyzed. For example, this filtering may prevent receiver $R_3$ (612) from analyzing the signal from transmitter $T_2$ (620), which is not in that receiver's group. It may also prevent a receiver from passing on (e.g., to a downstream block or process) a reflected signal which is reflected off the edge of the propagation medium. Generally speaking, filtering helps to prevent the introduction of noise and improves the quality of the sensing and/or simplifies the signal processing.

Returning to diagram 600, in this example, an amplitude metric is determined for each gap location (e.g., $x_1$, $x_2$, etc.) and these amplitude metrics are used to determine if there is a touch or not for the corresponding gap location. The following figure describes this in more detail.

Figure 7:
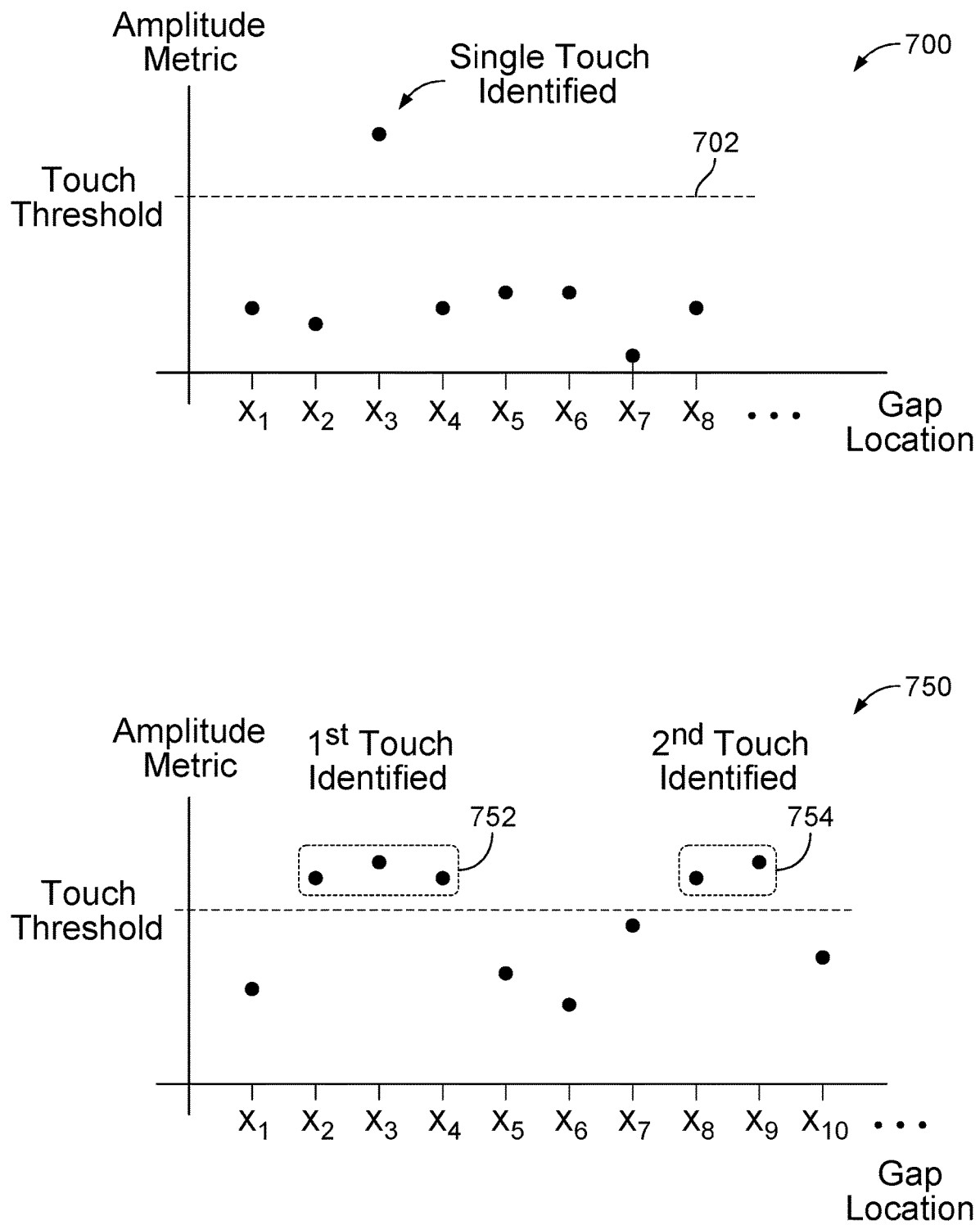
FIG. 7 is a diagram illustrating some embodiments of touches identified using amplitude metrics.

FIG. 7 is a diagram illustrating some embodiments of touches identified using amplitude metrics. In the example shown, diagram 700 corresponds to the example of FIG. 6 where there is a touch (622) between transmitter $T_2$ (620) and transmitter $T_3$ (618). The amplitude metric for each gap location (e.g., $x_1$, $x_2$, etc.) is plotted in this diagram, so that the x-axis corresponds to a particular gap location and the y-axis corresponds to the amplitude metric calculated for that particular gap.

In FIG. 6, $x_1$ corresponds to the gap between transmitter $T_1$ (624) and receiver $R_1$ (604), $x_2$ corresponds to the gap between receiver $R_1$ (604) and transmitter $T_2$ (620), and so on. In this example, the amplitude metric calculated for gap location $x_1$ is:

$$x_1 = T_1 R_1$$

where (generally speaking) $T_i R_j$ is a metric or value associated with a degree of change (if any) of an (e.g., current or new) amplitude compared to some amplitude reference. More specifically:

$$T_i R_j = 10 \log_{10} \frac{|Amplitude_{new}|}{|Amplitude_{reference}|}.$$

In some embodiments, the amplitude reference value (e.g., in the above $T_iR_j$ equation) is the largest or maximum amplitude from the reference data for that particular transmitter-receiver pair. For example, in diagram 650 in FIG. 6, if the dots superimposed on signal 652 correspond to the reference data stored for a given transmitter-receiver pair, then the amplitude reference value is the amplitude or value corresponding to the dot at the peak of signal 652.

Returning to diagram 700 in FIG. 7, the amplitude metrics for other gaps may be calculated as follows:

$$x_2 = \frac{1}{2}(T_2R_1 + (T_3R_1 - (T_2R_2 - T_3R_2))) = \frac{1}{2}(T_2R_1 + T_3R_1 - T_2R_2 + T_3R_2)$$

$$x_3 = \frac{1}{2}((T_2R_2 - T_3R_2) + (T_3R_1 - T_2R_1))$$

$$x_4 =$$

$$\frac{1}{2}(T_3R_2 + (T_2R_2 - (T_3R_1 - T_2R_1))) = \frac{1}{2}(T_3R_2 + T_2R_2 - T_3R_1 + T_2R_1)$$

$$\vdots$$

where $T_iR_j$ is calculated as described above.

It may be useful to discuss the $x_3$ equation in more detail in order to obtain insight into how the $x_2$ and $x_4$ equations are obtained. The two signals which pass through the $x_3$ gap are the $T_2R_2$ signal and the $T_3R_1$ signal. Therefore, it makes sense to use those signals in calculating a metric or value for $x_3$. However, both of those signals are two-gap signals but only the $x_3$ gap is of interest. Therefore, some part of those signals should be discounted or otherwise removed. For the $T_2R_2$ signal, this can be done by subtracting out $T_3R_2$, since that signal is a one-gap signal and exactly matches the part of the $T_2R_2$ signal which is trying to be removed or discounted. This produces the $(T_2R_2-T_3R_2)$ part of the $x_3$ equation above. Similarly, the $T_2R_1$ signal exactly matches the part of the $T_3R_1$ signal which is trying to be removed or discounted, and $T_2R_1$ can be subtracted from $T_3R_1$. This produces the $(T_3R_1-T_2R_1)$ part of the $x_3$ equation above.

The $x_3$ equation above also has a scaling factor of ½. This is to normalize $x_3$ to match the $x_1$ which only has a contribution from a single transmitter-receiver pair. To put it another way, without the scaling factor, the $x_1$ and $x_3$ calculations would have different dynamic ranges. Conceptually, two one-gap signals are being added together in the $x_3$ equation, where $(T_2R_2-T_3R_2)$ comprises one of the one-gap signals and $(T_3R_1-T_2R_1)$ comprises the other one-gap signal. In contrast, the $x_1$ equation only has a contribution from one one-gap signal.

This logic may be used to construct the $x_2$ and $x_4$ equations above. For the $x_2$ gap, the two signals which pass through that gap are the $T_2R_1$ signal and the $T_3R_1$ signal. The former signal is a one-gap signal and therefore may be used as-is. However, the $T_3R_1$ signal is a two-gap signal and part of it must be subtracted out. The $T_2R_2$ signal is close, but it is not perfect because it is itself a two-gap signal. However, if the $T_3R_2$ signal is subtracted from $T_2R_2$, then that difference (i.e., $T_2R_2-T_3R_2$) may be subtracted from $T_3R_1$. This produces the $T_3R_1-(T_2R_2-T_3R_2)$ part of the $x_2$ equation. For the reasons described above, the $x_2$ equation includes a ½ scaling factor. The $x_4$ equation can be constructed in a similar manner.

It is noted that the above equations are one example of a way to solve the problem of converting measurements $\{T_iR_j\}$ to segment values $\{x_k\}$. In some embodiments, some other equations are used. For example, different weights can provide other unbiased solutions, perhaps with different statistical variances. For example:

$$x_2 = \frac{3}{4}T_2R_1 + \frac{1}{4}T_3R_1 - \frac{1}{4}T_2R_2 + \frac{1}{4}T_3R_2.$$

In some embodiments, coefficients for estimation of segment values from measured values is determined by training or calibration on the known data during design or manufacturing with the objective of maximizing detection performance of the sensor. This is sometimes referred to as 'training' or 'calibration' of the sensor.

With the amplitude metrics calculated and plotted, a touch threshold (702) is used to identify any touches. In the example of diagram 700, the only gap location which has an amplitude metric greater than threshold 702 is $x_3$. As such, a single touch at the $x_3$ gap is identified. This corresponds to the touch (622) at the $x_3$ gap in diagram 600 in FIG. 6. In this example, the force value which is output for this identified touch is the amplitude metric calculated for $x_3$.

Diagram 750 shows another scenario (e.g., not corresponding to FIG. 6) where two touches are identified. As described above, the amplitude metrics for the gaps between transmitters and/or receivers are calculated and plotted. In this example, two touches are identified: a first touch (752) at the $x_2$, $x_3$, and $x_4$ gaps and a second touch (754) at the $x_8$ and $x_9$ gaps. In this example, the largest amplitude metric for each touch is output as the force value for that touch. This means outputting the value calculated for $x_3$ as the force value for the first touch and outputting the value for $x_9$ as the force value for the second touch. In some embodiments, the sum of the values above the threshold is output as the force of the touch.

Returning to FIG. 5, in some embodiments, the amount of phase change determined at step 500 and/or the amount of amplitude attenuation determined at step 502 is based on a plurality of propagating signals. For example, suppose an amount of phase change and/or an amount of amplitude attenuation is/are being determined for gap location $x_3$ between transmitter $T_2$ (620) and transmitter $T_3$ (618) in FIG. 6. Information from the $T_2R_2$ propagating signal as well as the $T_3R_1$ propagating signal may be used (e.g., since those propagating signals pass through that gap location). In some embodiments, information from additional propagating signals is/are used. The following figures describe this more generally and/or formally in a flowchart.

Figure 8:
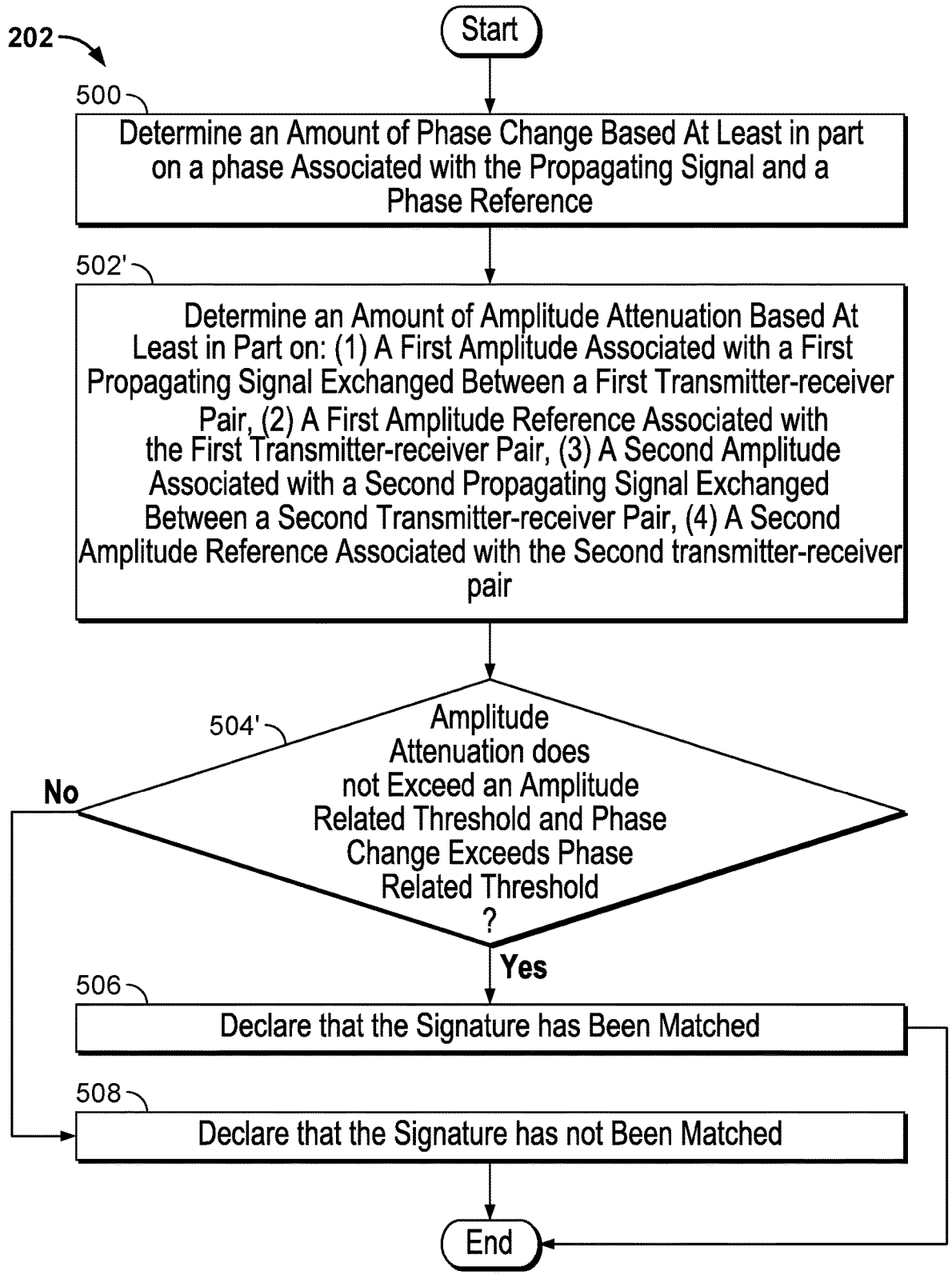
FIG. 8 is a flowchart illustrating an embodiment of a process to determine whether a signature is matched where information from a plurality of propagating signals is used to determine an amount of amplitude attenuation.

FIG. 8 is a flowchart illustrating an embodiment of a process to determine whether a signature is matched where information from a plurality of propagating signals is used to determine an amount of amplitude attenuation. In some embodiments, the process of FIG. 8 is used at step 202 in FIG. 2. FIG. 8 is similar to FIG. 5 and so the same or similar reference numbering is used to show related steps.

At 500, an amount of phase change is determined based at least in part on a phase associated with the propagating signal and a phase reference. At 502', an amount of amplitude attenuation is determined based at least in part on: (1) a first amplitude associated with a first propagating signal exchanged between a first transmitter-receiver pair, (2) a first amplitude reference associated with the first transmitter-receiver pair, (3) a second amplitude associated with a second propagating signal exchanged between a second transmitter-receiver pair, (4) a second amplitude reference associated with the second transmitter-receiver pair. Step 500 recites a first transmitter-receiver pair and a second transmitter-receiver pair but it is noted that step 500 (e.g., both in FIG. 5 and in FIG. 8) is not necessarily limited to just two transmitter-receiver pairs (i.e., three or more transmitter-receiver pairs may be used).

As an example of step 502', consider the $x_2$ gap in FIG. 6 between receiver $R_1$ (604) and transmitter $T_2$ (620). When generating an amount of amplitude attenuation for the $x_2$ gap, the propagating signal and amplitude reference associated with the $(T_2, R_1)$ transmitter-receiver pair may be used, as well as the propagating signal and amplitude reference associated with the $(T_3, R_1)$ transmitter-receiver pair (e.g., since those transmitter-receiver pairs exchange propagating signals through the $x_2$ gap).

In some embodiments, additional propagating signals are used, including propagating signals which do not pass through a gap (location) of interest (in this example, $x_2$). For example, suppose the amount of amplitude attenuation being determined at step 502' is the amplitude metric for a particular gap location in a shared receiver embodiment (see, e.g., the equations above and FIG. 7). The amplitude metric for the $x_2$ gap in FIG. 6 is:

$$x_2 = \frac{3}{4}T_2R_1 + \frac{1}{4}T_3R_1 - \frac{1}{4}T_2R_2 + \frac{1}{4}T_3R_2.$$

The propagating signal exchanged between the $(T_2, R_2)$ transmitter-receiver pair does not pass through the $x_2$ gap, nor does the propagating signal exchanged between the $(T_3, R_2)$ transmitter-receiver pair pass through the $x_2$ gap but if the amplitude metric is being determined at step 502' then information from those propagating signals is used.

At 504', it is determined if the amplitude attenuation does not exceed an amplitude related threshold and the phase change exceeds a phase related threshold. In some other embodiments, an amplitude threshold which is greater than or equal to the (e.g., original) touch threshold is used. In this example, a combined threshold is used where there are amplitude and phase threshold pairs creating a piecewise-linear threshold curve in the amplitude-vs-phase space.

If the check at step 504' passes, it is declared that the signature has been matched at 506. If the check at step 504' does not pass, then it is declared that the signature has not been matched at 508.

Returning to FIG. 5, similarly, information from two or more propagating signals may be used to determine an amount of phase change at step 500. The following figure shows an example of this.

Figure 9:
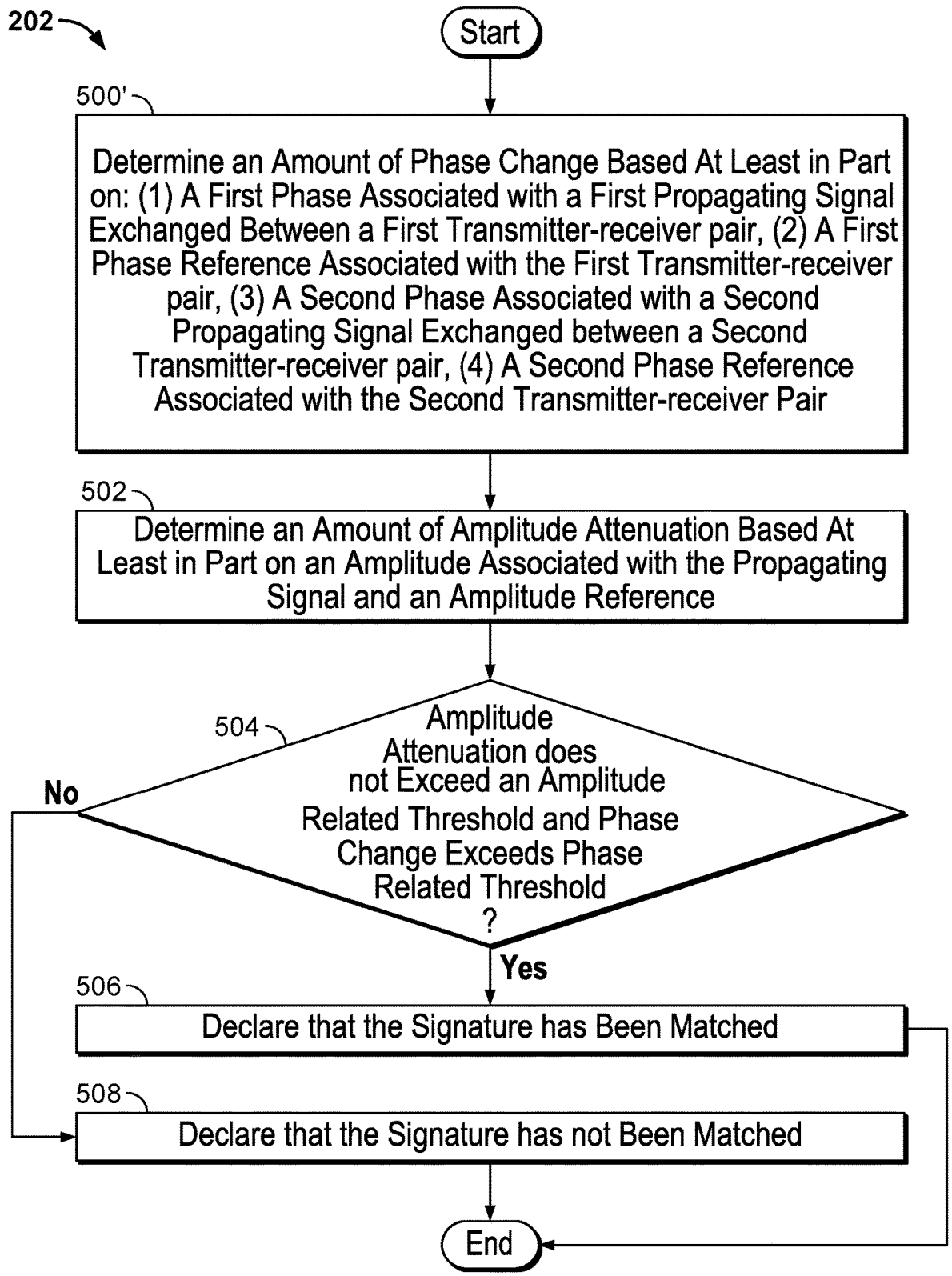
FIG. 9 is a flowchart illustrating an embodiment of a process to determine whether a signature is matched where information from a plurality of propagating signals is used to determine an amount of phase change.

FIG. 9 is a flowchart illustrating an embodiment of a process to determine whether a signature is matched where information from a plurality of propagating signals is used to determine an amount of phase change. In some embodiments, the process of FIG. 9 is used at step 202 in FIG. 2. FIG. 9 is similar to FIG. 5 and so the same or similar reference numbering is used to show related steps. In some embodiments, the process of FIG. 8 and FIG. 9 are used together at step 202 in FIG. 2.

At 500', an amount of phase change is determined based at least in part on: (1) a first phase associated with a first propagating signal exchanged between a first transmitter-receiver pair, (2) a first phase reference associated with the first transmitter-receiver pair, (3) a second phase associated with a second propagating signal exchanged between a second transmitter-receiver pair, (4) a second phase reference associated with the second transmitter-receiver pair.

To use the same gap location from above, consider the $x_2$ gap in FIG. 6 between receiver $R_1$ (604) and transmitter $T_2$ (620). When generating an amount of phase change for the $x_2$ gap, the propagating signal and phase reference associated with the $(T_2, R_1)$ transmitter-receiver pair may be used, as well as the propagating signal and phase reference associated with the $(T_3, R_1)$ transmitter-receiver pair (e.g., since those transmitter-receiver pairs exchange propagating signals through the $x_2$ gap).

Similar to above, information from additional propagating signals may be used, including propagating signals which do not pass through a gap of interest. For example, suppose a phase metric is generated, similar or identical to the above amplitude metric equations where the underlying $\theta T_iR_j$ equation is a function of the new/current phase and the phase reference (e.g., instead of the new/current amplitude and the amplitude reference). For example:

$$\theta T_iR_j = f(\text{Phase}_{new}, \text{Phase}_{reference})$$

Then, if $$\theta x_2 = \frac{3}{4}\theta T_2R_1 + \frac{1}{4}\theta T_3R_1 - \frac{1}{4}\theta T_2R_2 + \frac{1}{4}\theta T_3R_2,$$

information from the propagating signal exchanged between the $(T_2, R_2)$ transmitter-receiver pair and the propagating signal exchanged between the $(T_3, R_2)$ transmitter-receiver pair is used where those propagating signals do not pass through the $x_2$ gap. It is noted that coefficients for estimation of segment phase metrics from phase measurements do not necessarily have to be the same as those used for amplitude metrics. Similar to amplitude metric estimation (described above), phase metric coefficients may be determined from the known data during design or manufacturing with the objective of best detection performance and rejection of touches by undesirable objects or materials.

At 502, an amount of amplitude attenuation is determined based at least in part on an amplitude associated with the propagating signal and an amplitude reference.

At 504, it is determined if the amplitude attenuation does not exceed an amplitude related threshold and the phase change exceeds a phase related threshold. If so, it is declared that the signature has been matched at step 506. If not, it is declared that the signature has not been matched at 508.

The following figure is a system diagram which shows an example of blocks or components which perform the steps described above.

Figure 10:
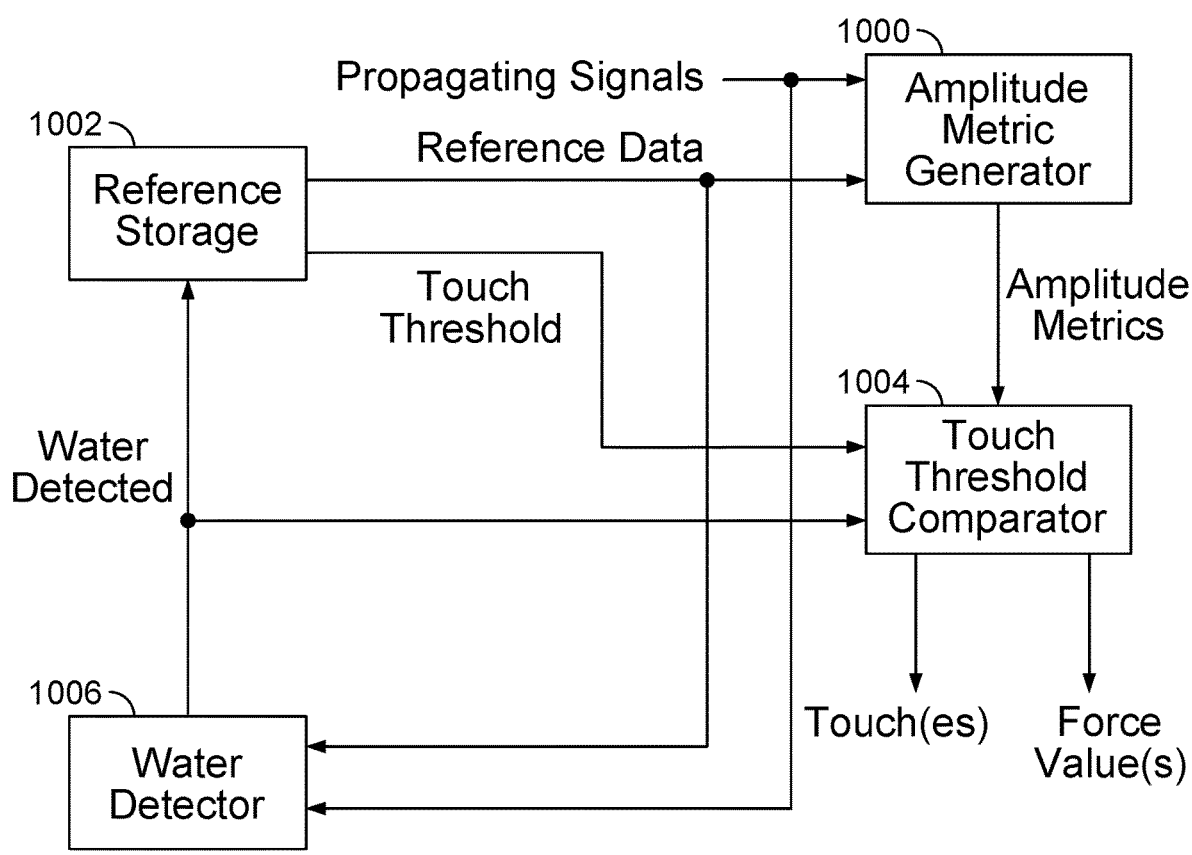
FIG. 10 is a system diagram illustrating an embodiment of components which generate a water detected signal or use that signal.

FIG. 10 is a system diagram illustrating an embodiment of components which generate a water detected signal or use that signal. For clarity and brevity, blocks or components which are not directly related to generating or using a water detected signal are not shown (e.g., blocks associated with pre-processing and/or grooming the propagating signals are not shown, such as analog to digital converters (ADC), filters, etc.). As described above, some other substance besides water may be detected.

Amplitude metric generation block (1000) generates an amplitude metric for each gap between adjacent transceivers. To do this, the amplitude metric generation block inputs one or more propagating signals and reference data from the reference storage (1002). As described above, the propagating signals may be pre-processed before being input to the amplitude metric generator.

The amplitude metrics output by the amplitude metric generator are passed to a touch threshold comparator (1004). The touch threshold comparator compares the amplitude metrics against a touch threshold to identify touches. This evaluation is performed for each gap location, as shown in FIG. 7. The touch threshold is stored in reference storage 1002 and is passed to touch threshold comparator (1004).

The touch threshold comparator (1004) outputs a touch signal (e.g., whether or not a touch was detected) for each gap location, as well as a corresponding force value (e.g., if there is a touch and the force value is applicable). The touch threshold comparator also inputs a water detected signal (e.g., for each gap location). If water is detected for a particular gap location, the touch threshold comparator will suppress or otherwise override any touch which is identified for that particular gap location (if applicable).

The water detected signal is also passed from the water detector (1006) to the reference storage (1002). In this example, the reference storage uses this signal to decide whether to update the reference data (e.g., with a current propagating signal). If the reference data is updated when there is water present on the propagating medium, then the reference data could become corrupted and a touch detection process in the future may generate a false positive. In some embodiments (e.g., shared receiver embodiments), each transmitter-receiver pair of interest (e.g., those which are evaluated and not ignored) has a corresponding set of reference data and the update decision is made on a pair by pair basis.

In some embodiments, the water detected signals which are passed to reference storage 1002 and touch threshold comparator 1004 are different versions (e.g., because the signals are being used in different manners and it is desirable for the signals to assert during different events or scenarios). For example, the version which is passed to reference storage 1002 may be generated per the process of FIG. 4 and the version which is passed to touch threshold comparator 1004 may be generated per the process of FIG. 5.

As described above, in some embodiments a water detected signal is used to decide whether to update reference data. First, an example of reference data associated with the shared receiver embodiment of FIG. 6 is described.

Figure 11:
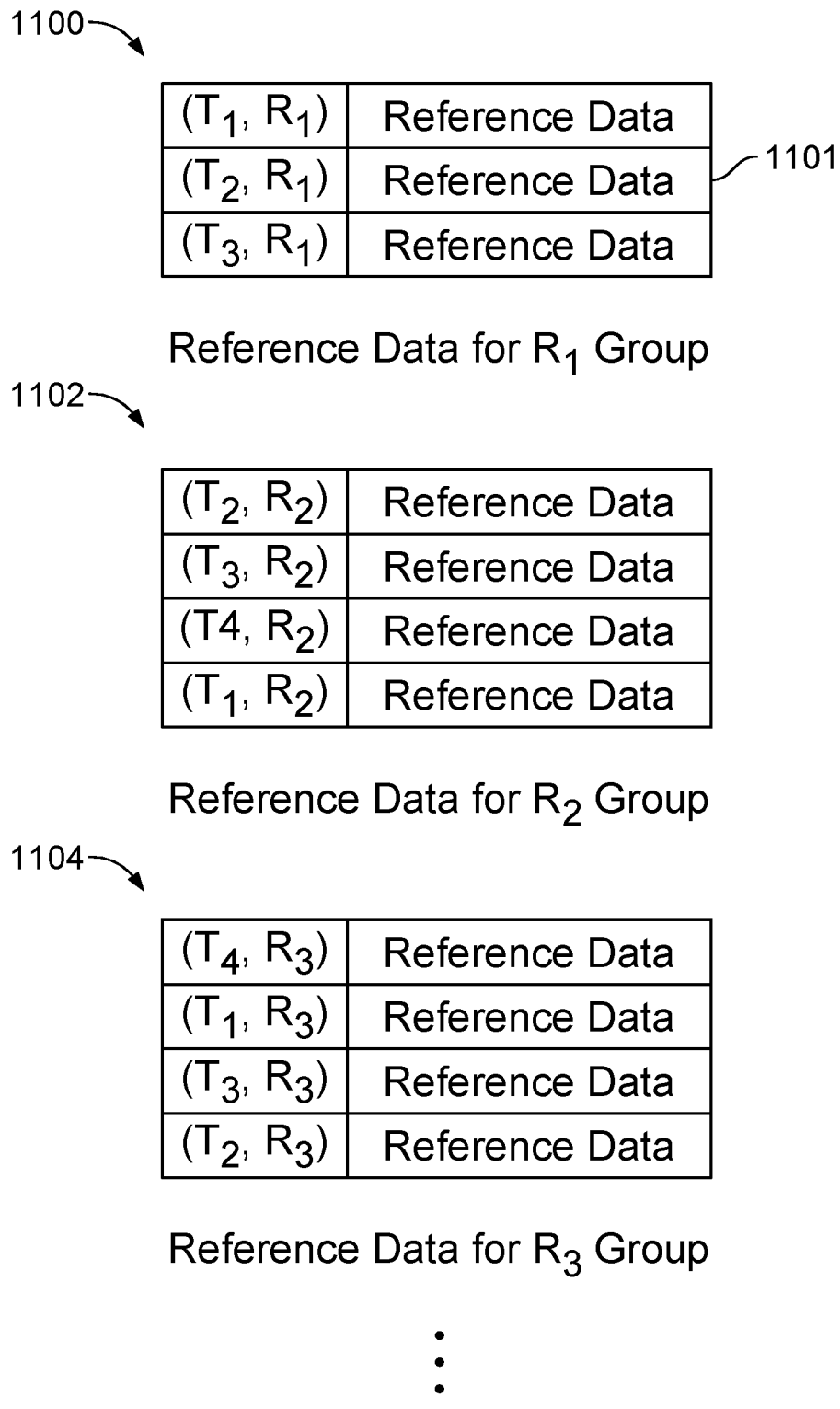
FIG. 11 is a diagram illustrating an embodiment of reference data.

FIG. 11 is a diagram illustrating an embodiment of reference data. In the example shown, reference data for the shared receiver embodiment of FIG. 6 is shown. Table 1100 shows reference data associated with the $R_1$ group (602) from FIG. 6. As shown in FIG. 6, the $R_1$ group includes three transmitter-receiver pairs: $(T_1, R_1)$, $(T_2, R_1)$, and $(T_3, R_1)$. In this example, the reference data stored for a given transmitter-receiver pair includes or is otherwise based on one or more previously received signals exchanged between that transmitter-receiver pair. For example, suppose signal 652 in diagram 650 in FIG. 6 is a signal exchanged between the $(T_1, R_1)$ transmitter-receiver pair and the system decides to save that signal as reference data for that pair. The dots (i.e., digital samples) superimposed on signal 652 are an example of the reference data that is stored for the $(T_1, R_1)$ transmitter-receiver pair. Due to storage limitations, an infinite number of digital samples cannot be stored and in the example of diagram 650 in FIG. 6, 9 digital samples (i.e., the dots shown) are stored as reference data for each transmitter-receiver pair.

Tables 1102 and 1104 show reference data for other groups. Table 1102 shows reference data stored for transmitter-receiver pairs in the $R_2$ group (i.e., group 606 in FIG. 6) and table 1104 shows reference data stored for transmitter-receiver pairs in the $R_3$ group (i.e., group 610 in FIG. 6). It is noted that for transmitter-receiver pairs where the receiver does not listen for the transmitter, reference data is not stored for such transmitter-receiver pairs.

If the presence of water is not properly managed and/or accounted for when updating reference data, corrupted and/or improperly updated reference data could cause the touch logic to detect a touch where there is none. Generally speaking, there are two approaches that can be taken when it comes to updating reference data when there is water present. In the first approach, the reference data is updated when the touch surface is wet which results in improper and/or undesirable reference data. This update is subsequently corrected by updating the reference data with more undesirable data when the water is no longer present on the touch surface. In the second approach, the update logic tries to better differentiate or identify when it should and should not update the reference data (e.g., ahead of time) and so subsequently does not need to make any correction of the reference data with proper and/or better data. The following figures more formally and/or generally describe these two approaches.

Figure 12:
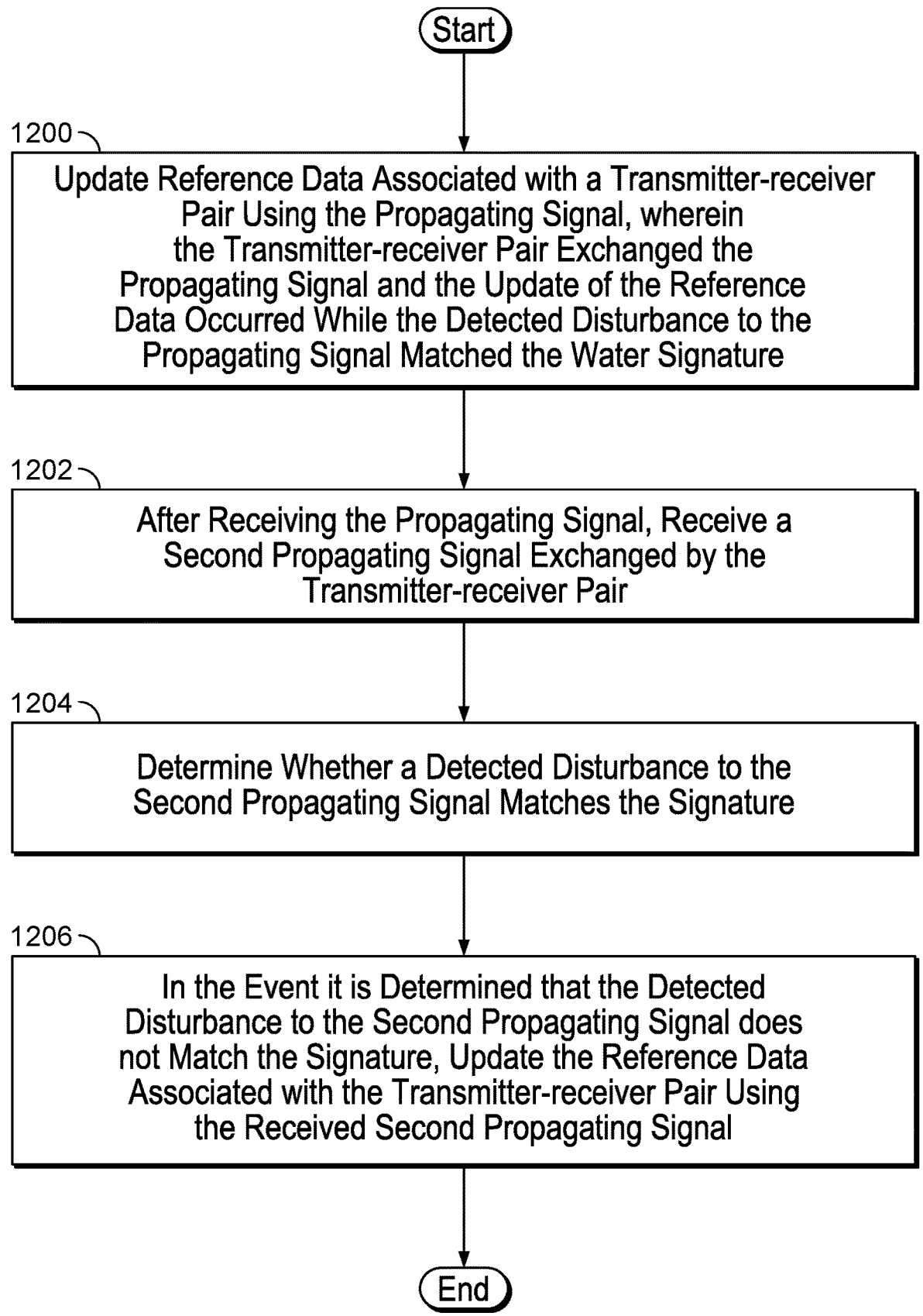
FIG. 12 is a flowchart illustrating an embodiment of a process to update wet reference data with dry reference data.

FIG. 12 is a flowchart illustrating an embodiment of a process to update wet reference data with dry reference data. In some embodiments, the process of FIG. 12 is performed in combination with one or more of the processes described above.

At 1200, reference data associated with a transmitter-receiver pair is updated using the propagating signal, wherein the transmitter-receiver pair exchanged the propagating signal and the update of the reference data occurred while the detected disturbance to the propagating signal matched the signature. For example, suppose reference data 1101 in FIG. 11 (associated with the transmitter-receiver pair $(T_2, R_1)$) is updated. Suppose that the $T_1R_1$ propagating signal passed through water (e.g., rain, condensation, etc.) and a copy of the wet propagating signal was saved as reference data. The update of the reference data with wet data is undesirable because it may subsequently cause the touch detection logic to identify a touch when there is in fact no touch.

At 1202, after receiving the propagating signal, a second propagating signal exchanged by the transmitter-receiver pair is received. In other words, the second propagating signal is exchanged at a later point in time compared to the (first) propagating signal.

At 1204, it is determined whether a detected disturbance to the second propagating signal matches the signature. In other words, the process is checking (e.g., at this later point in time) if there is (still) water or some other substance on the propagating medium. Various examples of matching a signature are described above and may be used at step 1204.

At 1206, in the event it is determined that the detected disturbance to the second propagating signal does not match the signature, the reference data associated with the transmitter-receiver pair is updated using the received second propagating signal. For example, earlier, the reference data was updated with a copy of the wet (first) propagating signal. Now, if no water is detected, the reference data is updated with a copy of the dry second propagating signal.

In some embodiments, this approach of fixing the reference data after the fact is desirable in systems where processing and/or power is more limited (e.g., because doing a better job ahead of time of identifying whether or not to update the reference data requires more processing resources, which in turn requires more power consumption).

Figure 13:
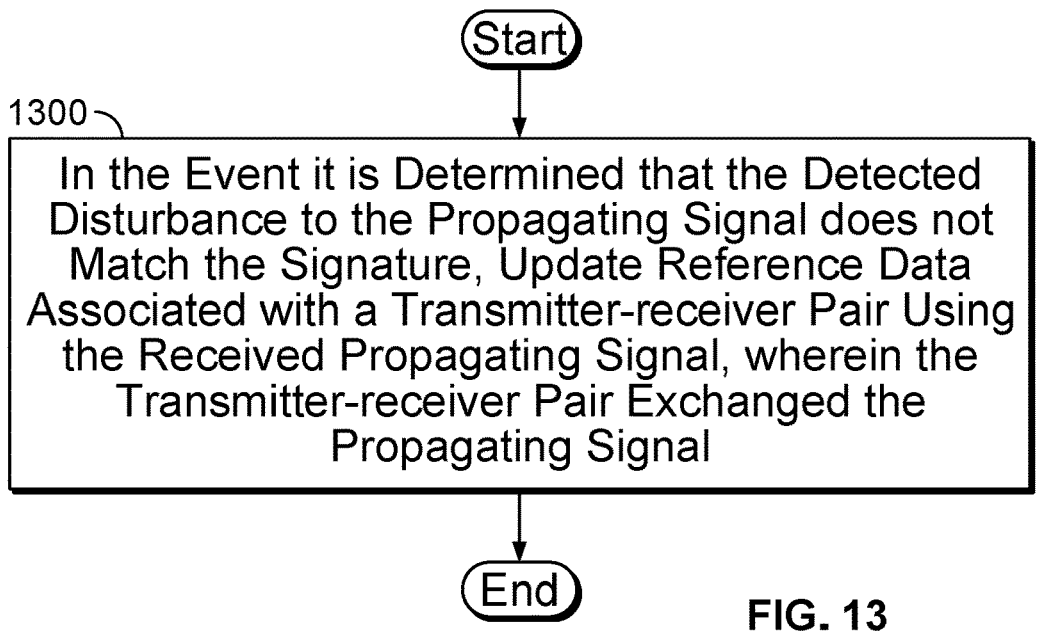
FIG. 13 is a flowchart illustrating an embodiment of a process to update reference data if a signature is not matched is described.

FIG. 13 is a flowchart illustrating an embodiment of a process to update reference data if a signature is not matched is described. In some embodiments, the process of FIG. 13 is performed in combination with one or more of the processes described above.

At 1300, in the event it is determined that the detected disturbance to the propagating signal does not match the signature, reference data associated with a transmitter-receiver pair is updated using the received propagating signal, wherein the transmitter-receiver pair exchanged the propagating signal. In other words, the reference data is only updated if no water is detected. If water is detected, then the reference data is kept as-is so it is not updated with undesirable data.

In some embodiments, the process of FIG. 13 has better performance compared to FIG. 12 but consumes more power and/or more processing resources. For example, this process may produce slightly better results than the process of FIG. 12 (e.g., no false touch detections which only briefly last when there is water and/or water is wiped away), but that difference may be indistinguishable to a user.

In some embodiments, a decision about whether a signature is matched is performed for a gap whereas the reference data which is being updated is associated with transmitter-receiver pairs. To reconcile this, in some embodiments, the gaps which a particular propagating signal passes through may be considered. For example, look at the propagating signal transmitted by $T_3$ (618) and received by $R_1$ (604) in FIG. 6. That propagating signal passes through the $x_2$ gap and the $x_3$ gap. In some embodiments, if water is not detected for both of those branches (i.e., the $x_2$ gap and the $x_3$ gap are both dry), then the reference data associated with the ($T_3$, $R_1$) transmitter-receiver pair is permitted to be updated. If the $x_2$ gap or the $x_3$ gap is wet, then the reference data associated with the ($T_3$, $R_1$) transmitter-receiver pair is not permitted to be updated.

Figure 14:
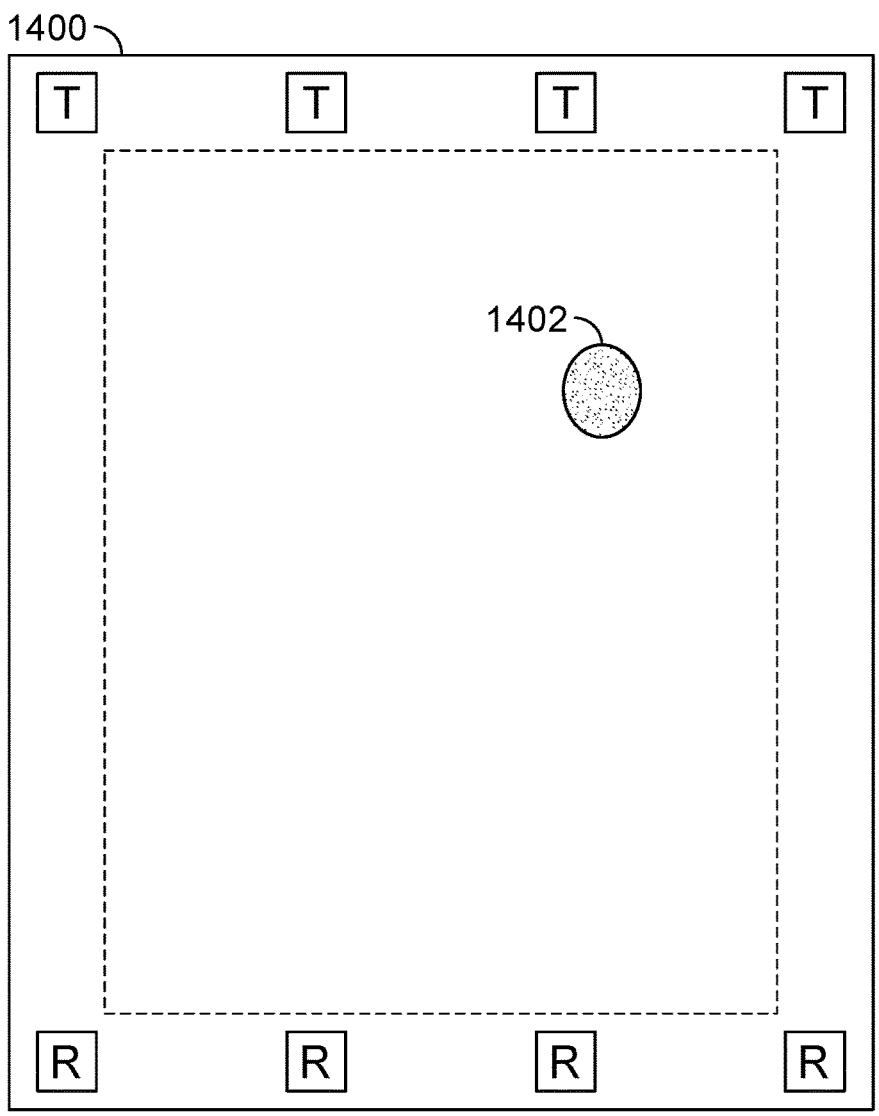
FIG. 14 is a diagram illustrating an embodiment of a two-dimensional touch surface.

FIG. 14 is a diagram illustrating an embodiment of a two-dimensional touch surface. In the example shown, surface 1400 is a two-dimensional touch surface where transmitters are arranged along the top of the touch surface and receivers are arranged along the bottom of the touch surface. Transmitter-receiver pairs are used to detect exemplary touch 1402 and/or a force value for touch 1402 and reference data associated with the transmitter-receiver pairs are updated using one or more of the techniques described above. To put it another way, the techniques described above for updating reference data are not limited to one-dimensional surfaces.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
receive a propagating signal transmitted through a propagating medium, wherein a detected disturbance to a signal property of the propagating signal is analyzed to detect whether a touch input has been provided;
determine whether the detected disturbance matches a signature, wherein determining whether the signature is matched includes:
determining an amount of phase change based at least in part on a phase associated with the propagating signal and a phase reference;
determining an amount of amplitude attenuation based at least in part on an amplitude associated with the propagating signal and an amplitude reference;
determining if the amplitude attenuation does not exceed an amplitude related threshold and the phase change exceeds a phase related threshold;
in the event it is determined that the amplitude attenuation does not exceed the amplitude related threshold and the phase change exceeds the phase related threshold, declaring that the signature has been matched; and
in the event it is determined that the amplitude attenuation exceeds the amplitude related threshold or the phase change does not exceed the phase related threshold, declaring that the signature has not been matched; and
in the event it is determined that the detected disturbance matches the signature, determine that the detected disturbance does not correspond to the touch input.

2. The system recited in claim 1, wherein determining whether the signature is matched includes:
determining if the phase change exceeds a phase related threshold;
in the event it is determined that the phase change exceeds the phase related threshold, declaring that the signature has been matched; and
in the event it is determined that the phase change does not exceed the phase related threshold, declaring that the signature has not been matched.

3. The system recited in claim 1, wherein the amount of phase change results from one or more of the following: a time shift or a propagation delay.

4. The system recited in claim 1, wherein the memory is further configured to provide the processor with instructions which when executed cause the processor to: in the event it is determined that the detected disturbance to the propagating signal does not match the signature, update reference data associated with a transmitter-receiver pair using the received propagating signal, wherein the transmitter-receiver pair exchanged the propagating signal.

5. A system, comprising:
a processor; and
a memory coupled with the processor, wherein the memory is configured to provide the processor with instructions which when executed cause the processor to:
receive a propagating signal transmitted through a propagating medium, wherein a detected disturbance to a signal property of the propagating signal is analyzed to detect whether a touch input has been provided;
determine whether the detected disturbance matches a signature, wherein determining whether the signature is matched includes:
determining an amount of phase change based at least in part on a phase associated with the propagating signal and a phase reference;
determining an amount of amplitude attenuation based at least in part on: (1) a first amplitude associated with a first propagating signal exchanged between a first transmitter-receiver pair, (2) a first amplitude reference associated with the first transmitter-receiver pair, (3) a second amplitude associated with a second propagating signal exchanged between a second transmitter-receiver pair, (4) a second amplitude reference associated with the second transmitter-receiver pair;

determining if the amplitude attenuation does not exceed an amplitude related threshold and the phase change exceeds a phase related threshold;

in the event it is determined that the amplitude attenuation does not exceed the amplitude related threshold and the phase change exceeds the phase related threshold, declaring that the signature has been matched; and in the event it is determined that the amplitude attenuation does exceed the amplitude related threshold or the phase change does not exceed the phase related threshold, declaring that the signature has not been matched; and in the event it is determined that the detected disturbance matches the signature, determine that the detected disturbance does not correspond to the touch input.

6. A system, comprising:

a processor; and a memory coupled with the processor, wherein the memory is configured to provide the processor with instructions which when executed cause the processor to:

receive a propagating signal transmitted through a propagating medium, wherein a detected disturbance to a signal property of the propagating signal is analyzed to detect whether a touch input has been provided;

determine whether the detected disturbance matches a signature, wherein determining whether the signature is matched includes:

determining an amount of phase change based at least in part on: (1) a first phase associated with a first propagating signal exchanged between a first transmitter-receiver pair, (2) a first phase reference associated with the first transmitter-receiver pair, (3) a second phase associated with a second propagating signal exchanged between a second transmitter-receiver pair, (4) a second phase reference associated with the second transmitter-receiver pair;

determining an amount of amplitude attenuation based at least in part on an amplitude associated with the propagating signal and an amplitude reference;

determining if the amplitude attenuation does not exceed an amplitude related threshold and the phase change exceeds a phase related threshold;

in the event it is determined that the amplitude attenuation does not exceed the amplitude related threshold and the phase change exceeds the phase related threshold, declaring that the signature has been matched; and in the event it is determined that the amplitude attenuation does exceed the amplitude related threshold or the phase change does not exceed the phase related threshold, declaring that the signature has not been matched; and in the event it is determined that the detected disturbance matches the signature, determine that the detected disturbance does not correspond to the touch input.

7. A system, comprising:

a processor; and a memory coupled with the processor, wherein the memory is configured to provide the processor with instructions which when executed cause the processor to:

receive a propagating signal transmitted through a propagating medium, wherein a detected disturbance to a signal property of the propagating signal is analyzed to detect whether a touch input has been provided;

determine whether the detected disturbance matches a signature;

in the event it is determined that the detected disturbance matches the signature, determine that the detected disturbance does not correspond to the touch input;

update reference data associated with a transmitter-receiver pair using the propagating signal, wherein the transmitter-receiver pair exchanged the propagating signal and the update of the reference data occurred while the detected disturbance to the propagating signal matched the signature;

after receiving the propagating signal, receive a second propagating signal exchanged by the transmitter-receiver pair;

determine whether a detected disturbance to the second propagating signal matches the signature; and in the event it is determined that the detected disturbance to the second propagating signal does not match the signature, update the reference data associated with the transmitter-receiver pair using the received second propagating signal.

8. A method, comprising:

receiving a propagating signal transmitted through a propagating medium, wherein a detected disturbance to a signal property of the propagating signal is analyzed to detect whether a touch input has been provided;

using a processor to determine whether the detected disturbance matches a signature, wherein determining whether the signature is matched includes:

determining an amount of phase change based at least in part on a phase associated with the propagating signal and a phase reference;

determining an amount of amplitude attenuation based at least in part on an amplitude associated with the propagating signal and an amplitude reference;

determining if the amplitude attenuation does not exceed an amplitude related threshold and the phase change exceeds a phase related threshold;

in the event it is determined that the amplitude attenuation does not exceed the amplitude related threshold and the phase change exceeds the phase related threshold, declaring that the signature has been matched; and in the event it is determined that the amplitude attenuation exceeds the amplitude related threshold or the phase change does not exceed the phase related threshold, declaring that the signature has not been matched; and in the event it is determined that the detected disturbance matches the signature, determining that the detected disturbance does not correspond to the touch input.

9. The method recited in claim 8, wherein determining whether the signature is matched includes:

determining if the phase change exceeds a phase related threshold;

in the event it is determined that the phase change exceeds the phase related threshold, declaring that the signature has been matched; and in the event it is determined that the phase change does not exceed the phase related threshold, declaring that the signature has not been matched.

10. The method recited in claim 8, wherein the amount of phase change results from one or more of the following: a time shift or a propagation delay.

11. The method recited in claim 8 further comprising: in the event it is determined that the detected disturbance to the propagating signal does not match the signature, updating reference data associated with a transmitter-receiver pair using the received propagating signal, wherein the transmitter-receiver pair exchanged the propagating signal.

12. A method, comprising:
receiving a propagating signal transmitted through a propagating medium, wherein a detected disturbance to a signal property of the propagating signal is analyzed to detect whether a touch input has been provided;
using a processor to determine whether the detected disturbance matches a signature, wherein determining whether the signature is matched includes:
determining an amount of phase change based at least in part on a phase associated with the propagating signal and a phase reference;
determining an amount of amplitude attenuation based at least in part on: (1) a first amplitude associated with a first propagating signal exchanged between a first transmitter-receiver pair, (2) a first amplitude reference associated with the first transmitter-receiver pair, (3) a second amplitude associated with a second propagating signal exchanged between a second transmitter-receiver pair, (4) a second amplitude reference associated with the second transmitter-receiver pair;
determining if the amplitude attenuation does not exceed an amplitude related threshold and the phase change exceeds a phase related threshold;
in the event it is determined that the amplitude attenuation does not exceed the amplitude related threshold and the phase change exceeds the phase related threshold, declaring that the signature has been matched; and
in the event it is determined that the amplitude attenuation does exceed the amplitude related threshold or the phase change does not exceed the phase related threshold, declaring that the signature has not been matched; and
in the event it is determined that the detected disturbance matches the signature, determining that the detected disturbance does not correspond to the touch input.

13. A method, comprising:
receiving a propagating signal transmitted through a propagating medium, wherein a detected disturbance to a signal property of the propagating signal is analyzed to detect whether a touch input has been provided;
using a processor to determine whether the detected disturbance matches a signature, wherein determining whether the signature is matched includes:
determining an amount of phase change based at least in part on: (1) a first phase associated with a first propagating signal exchanged between a first transmitter-receiver pair, (2) a first phase reference associated with the first transmitter-receiver pair, (3) a second phase associated with a second propagating signal exchanged between a second transmitter-receiver pair, (4) a second phase reference associated with the second transmitter-receiver pair;
determining an amount of amplitude attenuation based at least in part on an amplitude associated with the propagating signal and an amplitude reference;
determining if the amplitude attenuation does not exceed an amplitude related threshold and the phase change exceeds a phase related threshold;
in the event it is determined that the amplitude attenuation does not exceed the amplitude related threshold and the phase change exceeds the phase related threshold, declaring that the signature has been matched; and
in the event it is determined that the amplitude attenuation does exceed the amplitude related threshold or the phase change does not exceed the phase related threshold, declaring that the signature has not been matched; and
in the event it is determined that the detected disturbance matches the signature, determining that the detected disturbance does not correspond to the touch input.

14. A method, comprising:
receiving a propagating signal transmitted through a propagating medium, wherein a detected disturbance to a signal property of the propagating signal is analyzed to detect whether a touch input has been provided;
using a processor to determine whether the detected disturbance matches a signature;
in the event it is determined that the detected disturbance matches the signature, determining that the detected disturbance does not correspond to the touch input;
updating reference data associated with a transmitter-receiver pair using the propagating signal, wherein the transmitter-receiver pair exchanged the propagating signal and the update of the reference data occurred while the detected disturbance to the propagating signal matched the signature;
after receiving the propagating signal, receiving a second propagating signal exchanged by the transmitter-receiver pair;
determining whether a detected disturbance to the second propagating signal matches the signature; and
in the event it is determined that the detected disturbance to the second propagating signal does not match the signature, updating the reference data associated with the transmitter-receiver pair using the received second propagating signal.

15. A computer program product, the computer program product being embodied in a non-transitory computer readable storage medium and comprising computer instructions for:
receiving a propagating signal transmitted through a propagating medium, wherein a detected disturbance to a signal property of the propagating signal is analyzed to detect whether a touch input has been provided;
determining whether the detected disturbance matches a signature;
in the event it is determined that the detected disturbance matches the signature, determining that the detected disturbance does not correspond to the touch input;
updating reference data associated with a transmitter-receiver pair using the propagating signal, wherein the transmitter-receiver pair exchanged the propagating signal and the update of the reference data occurred while the detected disturbance to the propagating signal matched the signature;

after receiving the propagating signal, receiving a second propagating signal exchanged by the transmitter-receiver pair;

determining whether a detected disturbance to the second propagating signal matches the signature; and in the event it is determined that the detected disturbance to the second propagating signal does not match the signature, updating the reference data associated with the transmitter-receiver pair using the received second propagating signal.

* * * * *